(12) United States Patent
Komatsu et al.

(10) Patent No.: US 8,714,933 B2
(45) Date of Patent: May 6, 2014

(54) WATER SUPPLY APPARATUS

(75) Inventors: Takahide Komatsu, Tokyo (JP);
Kazuhiro Kaneda, Tokyo (JP);
Tomoharu Tejima, Tokyo (JP);
Nobuhiro Higaki, Tokyo (JP); Sachiko Miyauchi, Tokyo (JP)

(73) Assignee: Ebara Corporation, Tokyo (JP)

( * ) Notice: Subject to any disclaimer, the term of this patent is extended or adjusted under 35 U.S.C. 154(b) by 636 days.

(21) Appl. No.: 12/864,257

(22) PCT Filed: Jan. 22, 2009

(86) PCT No.: PCT/JP2009/051389
§ 371 (c)(1),
(2), (4) Date: Aug. 25, 2010

(87) PCT Pub. No.: WO2009/093750
PCT Pub. Date: Jul. 30, 2009

(65) Prior Publication Data
US 2010/0307619 A1 Dec. 9, 2010

(30) Foreign Application Priority Data

Jan. 24, 2008 (JP) ................................. 2008-013966
Dec. 25, 2008 (JP) ................................. 2008-330080

(51) Int. Cl.
*F04B 49/06* (2006.01)
*F04B 41/06* (2006.01)
*F04D 15/00* (2006.01)

(52) U.S. Cl.
USPC .................................. 417/5; 417/2; 417/44.2

(58) Field of Classification Search
USPC ................ 137/565.29, 565.33; 417/1–5, 44.2
See application file for complete search history.

(56) References Cited

U.S. PATENT DOCUMENTS

| 3,817,658 | A | * | 6/1974 | Murase | 417/5 |
| 5,206,810 | A | * | 4/1993 | Bools et al. | 701/100 |
| 5,253,981 | A | * | 10/1993 | Yang et al. | 417/5 |
| 5,259,731 | A | * | 11/1993 | Dhindsa et al. | 417/3 |
| 5,522,707 | A | * | 6/1996 | Potter | 417/4 |
| 5,743,714 | A | * | 4/1998 | Drob | 417/2 |

(Continued)

FOREIGN PATENT DOCUMENTS

| CN | 1755111 A | 4/2006 |
| JP | 53-137401 A | 11/1978 |

(Continued)

OTHER PUBLICATIONS

International Search Report of PCT/JP2009/051389, Mailing Date of Apr. 28, 2009.

*Primary Examiner* — John Rivell
(74) *Attorney, Agent, or Firm* — Westerman, Hattori, Daniels & Adrian, LLP

(57) ABSTRACT

A water supply apparatus is capable of performing a backup operation, without lowering water supply capability, when a failure has occurred in one control substrate due to surge or noise caused by lightning or sensor wear, by switching to the other control substrate, and capable of reliably performing the backup operation. The water supply apparatus includes: a plurality of pumps; a plurality of inverters each configured to change and control a rotational frequency of a corresponding one of the plurality of pumps; and a plurality of control substrates configured to control the plurality of inverters. When an abnormality occurs in one control substrate, other control substrate backs up the one control substrate to thereby allow the water supply apparatus to continue its operations. The one control substrate, the plurality of inverters, and the other control substrate are connected in series by communication lines.

17 Claims, 17 Drawing Sheets

(56) References Cited

U.S. PATENT DOCUMENTS

| | | | |
|---|---|---|---|
| 6,045,331 A * | 4/2000 | Gehm et al. | 417/2 |
| 6,257,833 B1 * | 7/2001 | Bates | 417/4 |
| 6,368,064 B1 * | 4/2002 | Bendikas et al. | 417/2 |
| 6,659,726 B2 * | 12/2003 | Holden | 417/2 |
| 7,174,731 B2 * | 2/2007 | Okano | 417/2 |
| 7,722,331 B2 * | 5/2010 | Hirasawa et al. | 417/5 |
| 7,878,765 B2 * | 2/2011 | Gonnella et al. | 417/44.2 |
| 7,955,056 B2 * | 6/2011 | Pettersson | 417/5 |
| 2006/0045750 A1 * | 3/2006 | Stiles | 417/42 |

FOREIGN PATENT DOCUMENTS

| | | |
|---|---|---|
| JP | 2-95786 A | 4/1990 |
| JP | 5-231332 A | 9/1993 |
| JP | 7-224765 A | 8/1995 |
| JP | 7-279885 A | 10/1995 |
| JP | 8-93680 A | 4/1996 |
| JP | 8-100772 A | 4/1996 |
| JP | 9-025874 A | 1/1997 |
| JP | 10-2293 A | 1/1998 |
| JP | 10-227293 A | 8/1998 |
| JP | 10-229695 A | 8/1998 |
| JP | 10-289001 A | 10/1998 |
| JP | 11-201055 A | 7/1999 |
| JP | 2000-9042 A | 1/2000 |
| JP | 2000-354397 A | 12/2000 |
| JP | 2005-351267 A | 12/2005 |
| JP | 2006-009805 A | 1/2006 |

* cited by examiner

———— communication 1
-------- communication 2
—·—·—· communication 3

———— communication 1
-------- communication 2
—·—·—· communication 3

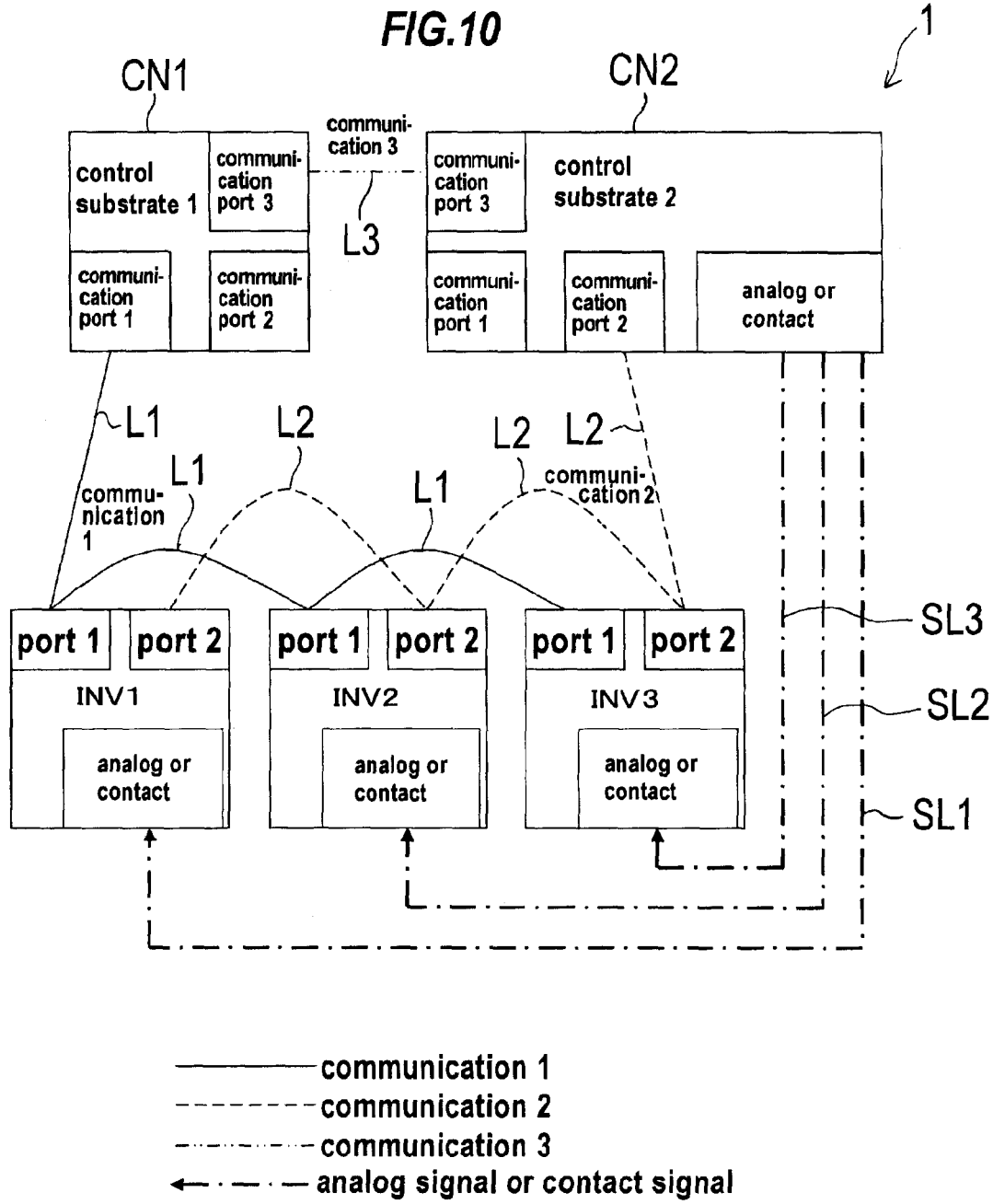

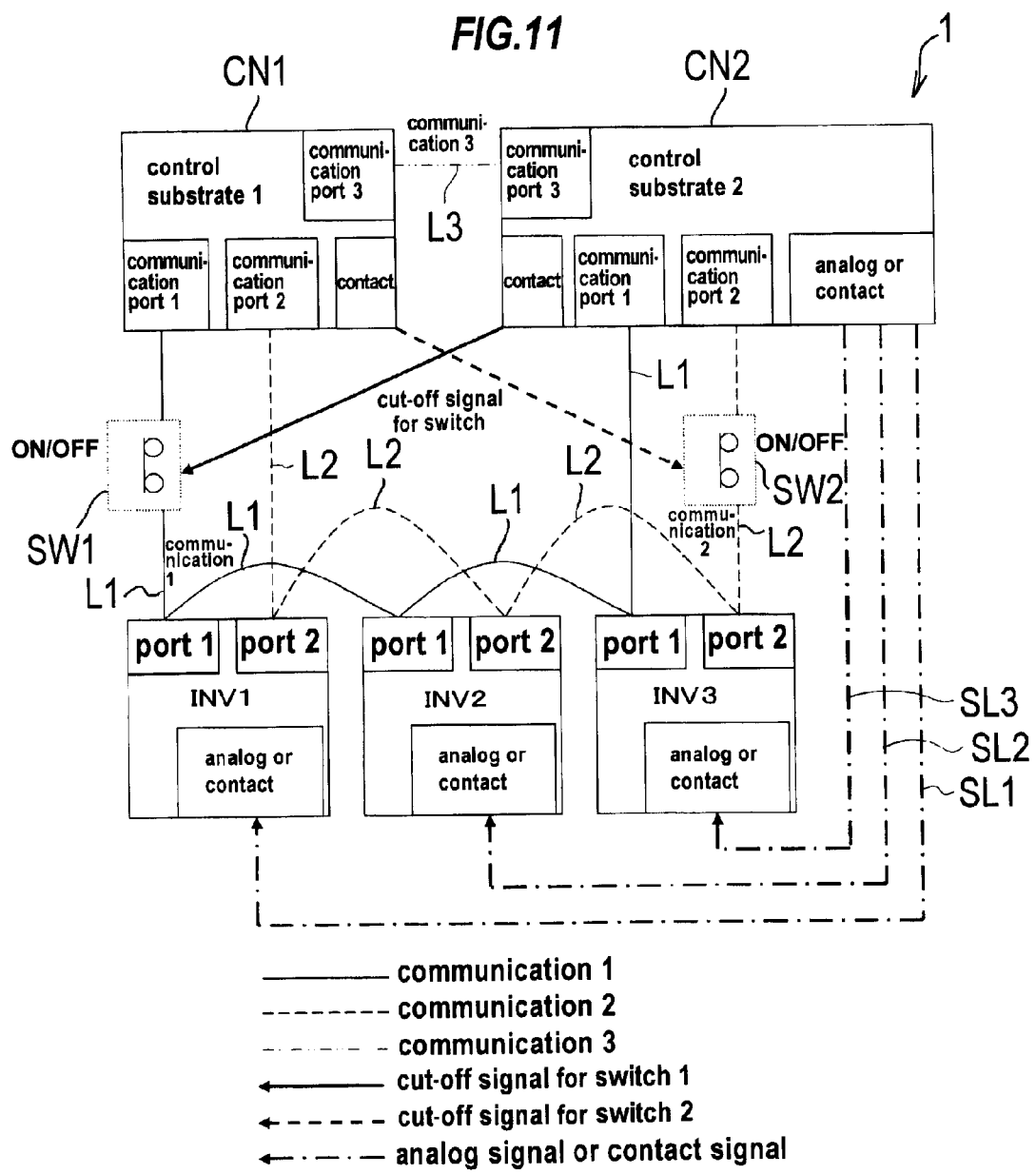

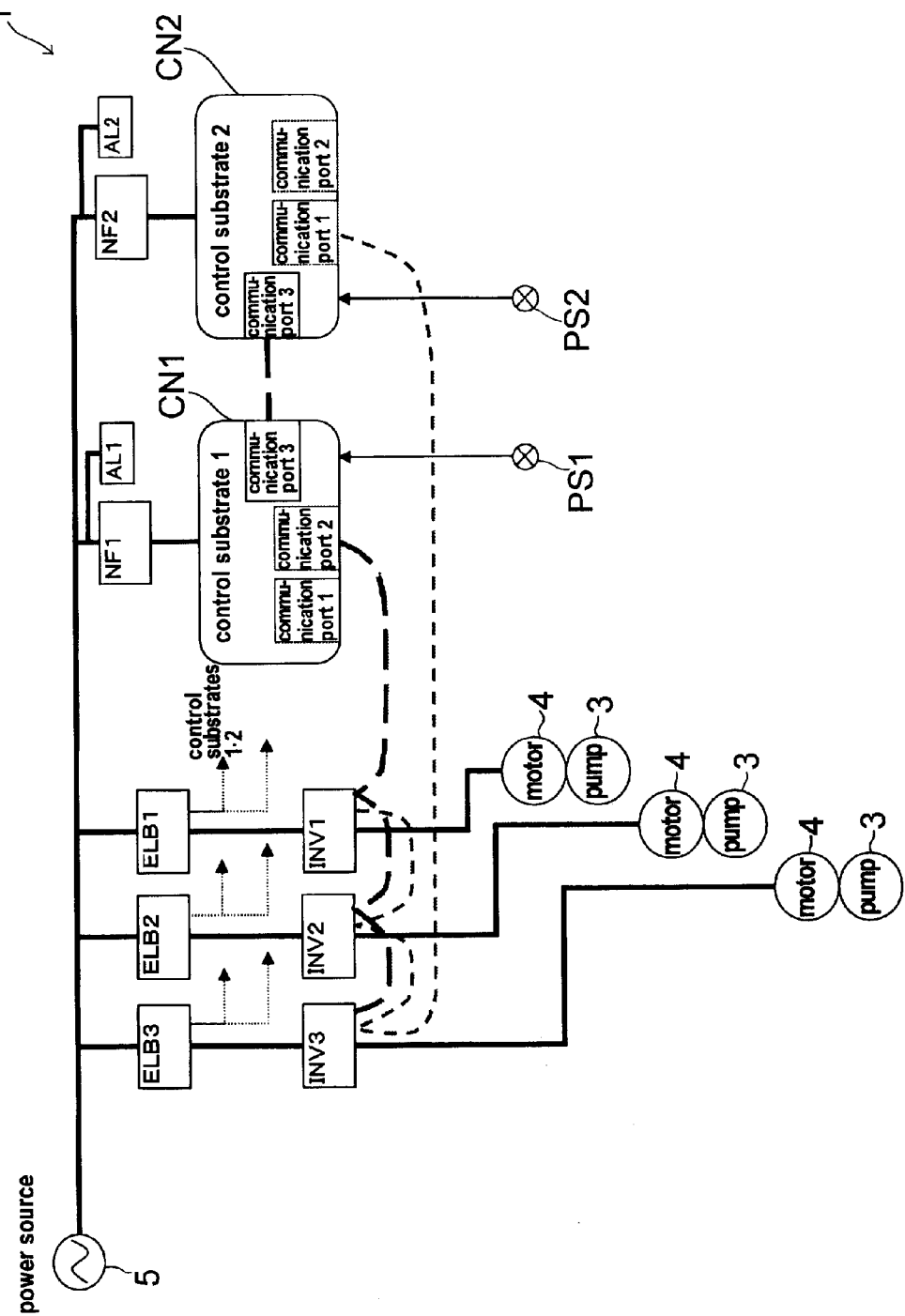

WATER SUPPLY APPARATUS

TECHNICAL FIELD

The present invention relates to a water supply apparatus, and more particularly to a water supply apparatus having multiple pumps and multiple inverters for supplying water to an apartment house or the like by operating the pumps at variable speeds.

BACKGROUND ART

A water supply apparatus, which is installed in an apartment house or a building, is a device for supplying water to respective water terminals. In the water supply apparatus, it is a common technique to operate a pump at variable speeds by using an inverter that converts frequency and voltage of a commercial AC power supply to desired frequency and voltage. The inverter is capable of changing rotational speed of a motor, which drives the pump, as desired. Therefore, the pump can be operated at an optimal rotational speed corresponding to a load, and energy can be saved compared to a case of operating the pump at a rated speed.

This type of water supply apparatus may have a plurality of pumps controlled by using a plurality of inverters. In this case, a control substrate is provided for controlling these pumps and inverters. In the water supply apparatus using pumps and inverters, when a failure (e.g., leakage of electricity, overcurrent, or open-phase) occurs in one pump, water supply operation is switched to another pump automatically, so that water failure can be avoided.

Japanese laid-open patent publication No. 2005-351267 discloses a water supply apparatus that never fails to supply water. In this apparatus, when a control substrate for controlling pumps and inverters stops functioning properly due to some causes during water supply operation, backup operation is performed so as to switch the faulty control substrate to a control substrate in a standby state.

DISCLOSURE OF INVENTION

However, the control substrate (control board) is susceptible to surge and noise, or the like caused by lightning, which often cause a failure of the control substrate. Further, decrease in lifetime of various sensors due to consumption thereof may often cause malfunction of the control substrate. Consequently, when one control substrate fails and another control substrate in a standby state is to be started, the backup operation may not be performed due to malfunction of the control substrate. In this manner, although the water supply apparatus has the backup function, such function may not work.

The present invention has been made in view of the above drawback. It is therefore an object of the present invention to provide a water supply apparatus capable of performing a backup operation, without lowering water supply capability, when a failure has occurred in one control substrate due to surge or noise or the like caused by lightning or due to lifetimes of various sensors, by switching to the other control substrate, and capable of reliably performing the backup operation by means of devices that prevent failure of the control substrates.

In order to achieve the above object, according to a first aspect of the present invention, there is provided a water supply apparatus including: a plurality of pumps; a plurality of inverters each configured for variable rotational speed control of a corresponding one of the plurality of pumps; and a plurality of control substrates (control boards) configured to control the plurality of inverters, wherein when an abnormality occurs in one control substrate, the other control substrate backs up the one control substrate to thereby allow the water supply apparatus to continue its operations, wherein the one control substrate, the plurality of inverters, and the other control substrate are connected in series by communication lines, and wherein a switch for turning on and off a communication is provided on the communication lines.

Abnormalities that can occur in the control substrate include not only an abnormality of the control substrate itself (e.g., an abnormality of CPU in the control substrate), but also situations in which the control substrate cannot function normally as a result of an abnormality occurred in one of devices (or one of parts) in respective systems connected to the control substrate. These situations include an abnormality in a power source, an abnormality in a power supply system for feeding power to the control substrate, a failure of a pressure sensor connected to the control substrate, and the like.

According to the present invention, when an abnormality has occurred in one control substrate, the other control substrate, which is in a standby state, performs the backup operation. When the backup operation is performed, the switch for turning on and off the communication is turned off to physically block the communication line between the control substrate in an abnormal state and the inverters. Consequently, the plural inverters are controlled only by the other control substrate.

In a preferred aspect of the present invention, an output device configured to output signals for turning on and off the switch is provided in the one control substrate or the other control substrate.

According to the present invention, the switch for separating the control substrate in an abnormal state from the communication line can be operated by ON/OFF signals outputted from the normal control substrate.

In a preferred aspect of the present invention, the switch is provided on a communication line connecting the one control substrate and/or the other control substrate to a first one of the plurality of inverters.

According to the present invention, the communication between the control substrate in which an abnormality has occurred and the first inverter can be cut off. Therefore, a wrong command from the faulty control substrate is not transmitted to any inverters.

In a preferred aspect of the present invention, the plurality of control substrates have a function to stop the communication of the other control substrate in operation and to reset the switch, in order to restart the one control substrate after the switch is operated as a result of occurrence of the abnormality in the one control substrate.

According to the present invention, upon occurrence of an abnormality in the one control substrate in operation, the switch for turning on and off the communication is turned off, and the control substrate is switched to the other control substrate, so that the inverters are controlled by the other control substrate. During this control operation by the other control substrate, the communication of this control substrate is stopped, and the switch in an OFF state is reset to ON. Then, the control substrate, in which the abnormality has occurred, is restarted and thus returned.

In a preferred aspect of the present invention, power switches are provided in a power supply system for supplying power to the one control substrate and the other control substrate, respectively.

According to the present invention, when the one control substrate or a signal system related thereto is repaired or replaced, the power switch is turned off to separate the one control substrate, thereby enabling the other control substrate to continue the operation of the apparatus.

In a preferred aspect of the present invention, the power switches are provided in the plurality of control substrates.

In a preferred aspect of the present invention, the one control substrate and the other control substrate are supplied with power at all times.

According to the present invention, the power switches are on at all times, and the power supply circuits in the control substrates are also on at all times. Therefore, when an abnormality occurs in either one of the control substrates, the other control substrate can back up the one control substrate immediately. Consequently, the operation of the water supply apparatus can be maintained. Further, when the control substrate in an abnormal state is returned, its returning operation can be completed in a short time.

In a preferred aspect of the present invention, the one control substrate and the other control substrate are connected via a communication line, and a monitoring device for monitoring whether or not the plurality of control substrates are operating normally is provided.

According to the present invention, the monitoring device can monitor whether the control substrates are operating normally or not using the communication line connecting the one control substrate and the other control substrate. Therefore, the backup operation or the returning operation after the backup operation can be performed after it is checked whether or not those operations can be performed.

The monitoring device may be arranged at a location other than the one control substrate and the other control substrate.

In a preferred aspect of the present invention, the one control substrate and the other control substrate are connected via a communication line, and a monitoring device for monitoring whether or not the plurality of control substrates and the plurality of inverters are communicating normally is provided.

According to the present invention, the monitoring device can monitor whether the communication between the control substrates and the inverters is functioning properly or not using the communication line connecting the one control substrate and the other control substrate. Therefore, the backup operation or the returning operation after the backup operation can be performed after it is checked whether or not those operations can be performed.

The monitoring device may be arranged at a location other than the one control substrate and the other control substrate.

In a preferred aspect of the present invention, the at least one control substrate and the plurality of inverters are connected by signal lines that convey analog signals or contact signals.

According to the present invention, even if all of the communications fail to function, the inverters can be controlled by the analog signals or the contact signals through the signal lines connecting the control substrate and the inverters. That is, even when the abnormality occurs in the communication, the water supply apparatus can continue its operation by backing up the communication with the analog signals or the contact signals that are resistant to external causes, such as surge and noise.

In a preferred aspect of the present invention, the one control substrate and the other control substrate have the pressure-detecting sections; a pressure sensor is provided in one of the pressure-detecting sections; and a pressure switch is provided in other of the pressure-detecting sections.

According to the present invention, the pressure sensor is connected to the one control substrate and the pressure switch is connected to the other control substrate.

Because the pressure switch has a higher level of resistance to the external causes, such as noise, than that of the pressure sensor, the influence of the external causes can be reduced. Therefore, when the backup is needed, backup systems, including the control substrate connected to the pressure switch, can be operated reliably.

In a preferred aspect of the present invention, each of the one control substrate and the other control substrate has at least one set of pressure-detecting devices.

According to the present invention, at least one set of pressure-detecting devices is provided for each control substrate. Therefore, even if an abnormality occurs in the pressure-detecting device for the one control substrate, the pressure-detecting device for the other control substrate can back up the faulty pressure-detecting device.

In a preferred aspect of the present invention, the water supply apparatus further includes a judging device configured to compare detected values inputted from the pressure-detecting devices into the one control substrate and the other control substrate and to judge that the input signals are abnormal when the detected values are different.

According to the present invention, in case of a failure or an abnormality in the pressure-detecting device, such failure or abnormality can be detected immediately.

In a preferred aspect of the present invention, the one control substrate and the other control substrate have power input sections, respectively; and each of the power input sections is connected to a corresponding one of power supply sections and is configured to be able to be connected to other of the power supply sections.

According to the present invention, if a failure occurs in one power supply section while it supplies power to the power input section of the one control substrate, the other power supply section can back up the faulty power supply section to feed power to the power input section of the one control substrate.

In a preferred aspect of the present invention, the one control substrate and the other control substrate include the power supply sections therein, respectively.

In a preferred aspect of the present invention, the water supply apparatus further includes a plurality of operation indicators through which various kinds of settings for operation and control of the water supply apparatus are performed, the plurality of operation indicators being connected to the plurality of control substrates, respectively, wherein the plurality of operation indicators have displays configured to indicate operating conditions of the water supply apparatus.

According to a second aspect of the present invention, there is provided a water supply apparatus, including: a plurality of pumps; a plurality of inverters each configured for variable rotational speed control of a corresponding one of the plurality of pumps; and a plurality of control substrates (control boards) configured to control the plurality of inverters, wherein when an abnormality occurs in one control substrate, the other control substrate backs up the one control substrate to thereby allow the water supply apparatus to continue its operations, wherein each of the plurality of inverters is provided with at least two different communication ports, and wherein the one control substrate is connected to the plurality of inverters in series by communication lines and the other control substrate is connected to the plurality of inverters in series by different communication lines.

Abnormalities that can occur in the control substrate include not only an abnormality of the control substrate itself (e.g., an abnormality of CPU in the control substrate), but also situations in which the control substrate cannot function normally as a result of an abnormality occurred in one of devices (or one of parts) in respective systems connected to the control substrate. These situations include an abnormality in a power source, an abnormality in a power supply system for feeding power to the control substrate, a failure of a pressure sensor connected to the control substrate, and the like.

According to the present invention, the one control substrate is connected to the plurality of inverters in series by communication lines and the other control substrate is connected to the plurality of inverters in series by different communication lines. With these arrangements, when an abnormality occurs in one of the multiple sets of communication lines, the communication can be secured by the other set of communication lines. Therefore, the inverters can be prevented from going out of control caused by a failure of the communication lines due to noise or the like.

In a preferred aspect of the present invention, each of the plurality of control substrates is provided with at least two different communication ports, and the one control substrate, the plurality of inverters, and the other control substrate are connected in series by a plurality of communication lines, respectively.

In a preferred aspect of the present invention, different communication lines extend respectively from the one control substrate and the other control substrate to a last one of the plurality of inverters in series.

In a preferred aspect of the present invention, the at least one control substrate and the plurality of inverters are connected by signal lines that convey analog signals or contact signals.

According to the present invention, even if all of the communications fail to function, the inverters can be controlled by the analog signals or the contact signals through the signal lines connecting the control substrate and the inverters. That is, even when the abnormality occurs in the communication, the water supply apparatus can continue its operation by backing up the communication with the analog signals or the contact signals that are resistant to external causes, such as surge and noise.

In a preferred aspect of the present invention, a switch for turning on and off a communication is provided on the communication lines connecting the one control substrate or the other control substrate to the plurality of inverters.

According to the present invention, when an abnormality has occurred in one control substrate, the other control substrate, which is in a standby state, performs the backup operation. When the backup operation is performed, the other control substrate outputs an OFF signal for the switch to turn off the switch to thereby physically break the communication line between the control substrate in an abnormal state and the inverters. Consequently, the plural inverters are controlled only by the other control substrate. Therefore, a wrong command is not transmitted from the faulty control substrate to the inverters.

In a preferred aspect of the present invention, the switch is provided on a communication line connecting the one control substrate and/or the other control substrate to a first one of the plurality of inverters.

According to the present invention, the communication between the faulty control substrate and the first inverter can be cut off. Therefore, a wrong command from the faulty control substrate is not transmitted to any inverters.

In a preferred aspect of the present invention, the one control substrate and the other control substrate have pressure-detecting sections; a pressure sensor is provided in one of the pressure-detecting sections; and a pressure switch is provided in other of the pressure-detecting sections.

According to the present invention, the pressure sensor is connected to the one control substrate and the pressure switch is connected to the other control substrate. Because the pressure switch has a higher level of resistance to the external causes, such as noise, than that of the pressure sensor, the influence of the external causes can be reduced. Therefore, when the backup is needed, systems at the backup side, including the control substrate connected to the pressure switch, can be operated reliably.

In a preferred aspect of the present invention, each of the one control substrate and the other control substrate has at least one set of pressure-detecting devices.

According to the present invention, at least one set of pressure-detecting devices is provided for each control substrate. Therefore, even if an abnormality occurs in the pressure-detecting device for the one control substrate, the pressure-detecting device for the other control substrate can back up the faulty pressure-detecting device.

In a preferred aspect of the present invention, the water supply apparatus further includes a judging device configured to compare detected values inputted from the pressure detecting devices into the one control substrate and the other control substrate and to judge that the input signals are abnormal when the detected values are different.

According to the present invention, in case of a failure or an abnormality in the pressure-detecting device, such failure or abnormality can be detected immediately.

In a preferred aspect of the present invention, the one control substrate and the other control substrate have power input sections, respectively; and each of the power input sections is connected to a corresponding one of power supply sections and is configured to be able to be connected to other of the power supply sections.

According to the present invention, if a failure occurs in one power supply section while it supplies power to the power input section of the one control substrate, the other power supply section can back up the faulty power supply section to feed power to the power input section of the one control substrate.

In a preferred aspect of the present invention, the one control substrate and the other control substrate include the power supply sections therein, respectively.

In a preferred aspect of the present invention, the water supply apparatus further includes a plurality of operation indicators through which various kinds of settings for operation and control of the water supply apparatus are performed, the plurality of operation indicators being connected to the plurality of control substrates, respectively, wherein the plurality of operation indicators have displays configured to indicate operating conditions of the water supply apparatus.

According to a third aspect of the present invention, there is provided a water supply apparatus, including: a plurality of pumps; a plurality of inverters each configured for variable rotational speed control of a corresponding one of the plurality of pumps; and a plurality of control substrates (control boards) configured to control the plurality of inverters, wherein when an abnormality occurs in one control substrate, the other control substrate backs up the one control substrate to thereby allow the water supply apparatus to continue its operations, wherein multiple sets of power supply systems, multiple sets of signal systems, and multiple sets of control systems are connected to the one control substrate and the other control substrate, and wherein in at least one of the power supply systems, the signal systems, and the control systems, one of the multiple sets has a different level of resistance to external causes from a level of resistance to the external causes of other of the multiple sets.

Abnormalities that can occur in the control substrate include not only an abnormality of the control substrate itself (e.g., an abnormality of CPU in the control substrate), but also situations in which the control substrate cannot function normally as a result of an abnormality occurred in one of devices (or one of parts) in respective systems connected to the control substrate. These situations include an abnormality in a power source, an abnormality in a power supply system for feeding power to the control substrate, a failure of a pressure sensor connected to the control substrate, and the like.

According to the present invention, the systems, connected to the backup control substrate, can have a higher level of tolerance to the surge and noise and a higher level of resistance to external causes, such as water-pressure resistance. Therefore, when the backup operation is needed, the systems at the backup side including the control substrate can be operated reliably.

In a preferred aspect of the present invention, the level of resistance to the external causes is a level of tolerance to at least one of surge and noise.

In a preferred aspect of the present invention, the level of tolerance to the surge and/or noise with respect to the other of the multiple sets connected to the other control substrate is higher than the level of tolerance to the surge and/or noise with respect to the one of the multiple sets connected to the one control substrate.

In a preferred aspect of the present invention, the level of resistance to the external causes is water-pressure resistance of a pressure-detecting section; and water-pressure resistance of a pressure-detecting section connected to the one control substrate is different from water-pressure resistance of a pressure-detecting section connected to the other control substrate.

According to the present invention, the pressure-detecting sections have different water-pressure resistances. Therefore, even if high water pressure, such as water hammer, is applied to the pressure-detecting sections, failure risk of the pressure-detecting sections can be reduced.

In a preferred aspect of the present invention, a plurality of pressure-detecting sections are connected to each of the one control substrate and the other control substrate; and the plurality of pressure-detecting sections in the same control substrate have different water-pressure resistances.

In a preferred aspect of the present invention, the one control substrate and the other control substrate have pressure-detecting sections; a pressure sensor is provided in one of the pressure-detecting sections; and a pressure switch is provided in other of the pressure-detecting sections.

According to the present invention, the pressure sensor is connected to the one control substrate and the pressure switch is connected to the other control substrate. Because the pressure switch has a higher level of resistance to the external causes, such as noise, than that of the pressure sensor, the influence of the external causes can be reduced. Therefore, when the backup is needed, the systems at the backup side, including the other control substrate connected to the pressure switch, can be operated reliably.

In a preferred aspect of the present invention, each of the one control substrate and the other control substrate has at least one set of pressure-detecting devices.

According to the present invention, at least one set of pressure-detecting devices is provided for each control substrate. Therefore, even if an abnormality occurs in the pressure-detecting device for the one control substrate, the pressure-detecting device for the other control substrate can back up the faulty pressure-detecting device.

In a preferred aspect of the present invention, the water supply apparatus further includes a judging device configured to compare detected values inputted from the pressure-detecting devices into the one control substrate and the other control substrate and to judge that the input signals are abnormal when the detected values are different.

According to the present invention, in case of a failure or an abnormality in the pressure-detecting device, such failure or abnormality can be detected immediately.

In a preferred aspect of the present invention, the one control substrate and the other control substrate have power input sections, respectively; and each of the power input sections is connected to a corresponding one of power supply sections and is configured to be able to be connected to other of the power supply sections.

According to the present invention, if a failure occurs in one power supply section while it supplies power to the power input section of the one control substrate, the other power supply section can back up the faulty power supply section to feed power to the power input section of the one control substrate.

In a preferred aspect of the present invention, the one control substrate and the other control substrate include the power supply sections therein, respectively.

According to the present invention, the following effects can be achieved.

(1) Even if one control substrate (control board) fails to function as a result of surge, noise, or the like caused by lightning or lifetime of various sensors, the other control substrate can allow the water supply apparatus to maintain its operation without lowering water supply capacity.

(2) Because one control substrate is connected to the plurality of inverters in series by the communication lines and the other control substrate is connected to the plurality of inverters in series by the different communication lines, even if an abnormality occurs in one of the multiple sets of communication lines, the communication can be maintained by the other set of communication lines. Therefore, the inverters can be prevented from going out of control that can be caused by a failure of the communication lines due to noise or the like.

(3) Because the systems, connected to the backup control substrate, have a higher level of tolerance to the surge and noise and a higher level of resistance to external causes, such as water-pressure resistance, the systems at the backup side including the control substrate can be operated reliably when the backup operation is needed.

(4) Possible causes of simultaneous failure of the control substrates include application of high water pressure, e.g., water hammer, to the pressure-detecting sections. Such high water pressure may exceed water pressure limit of the pressure-detecting sections and may cause breakdown of the pressure-detecting sections. According to the present invention, because the pressure-detecting sections have different water-pressure resistances, the failure risk of the pressure-detecting sections can be reduced.

BRIEF DESCRIPTION OF DRAWINGS

FIG. 10 is a view showing an embodiment of the water supply apparatus according to the present invention;

FIG. 11 is a schematic view showing an embodiment in which switches for turning on and off the communications are provided in the water supply apparatus shown in FIG. 10;

FIG. 12 is a view showing an embodiment of the water supply apparatus according to the present invention and is a schematic view showing further details of arrangement of components of the water supply apparatus shown in FIG. 1;

BEST MODE FOR CARRYING OUT THE INVENTION

Figure 1:
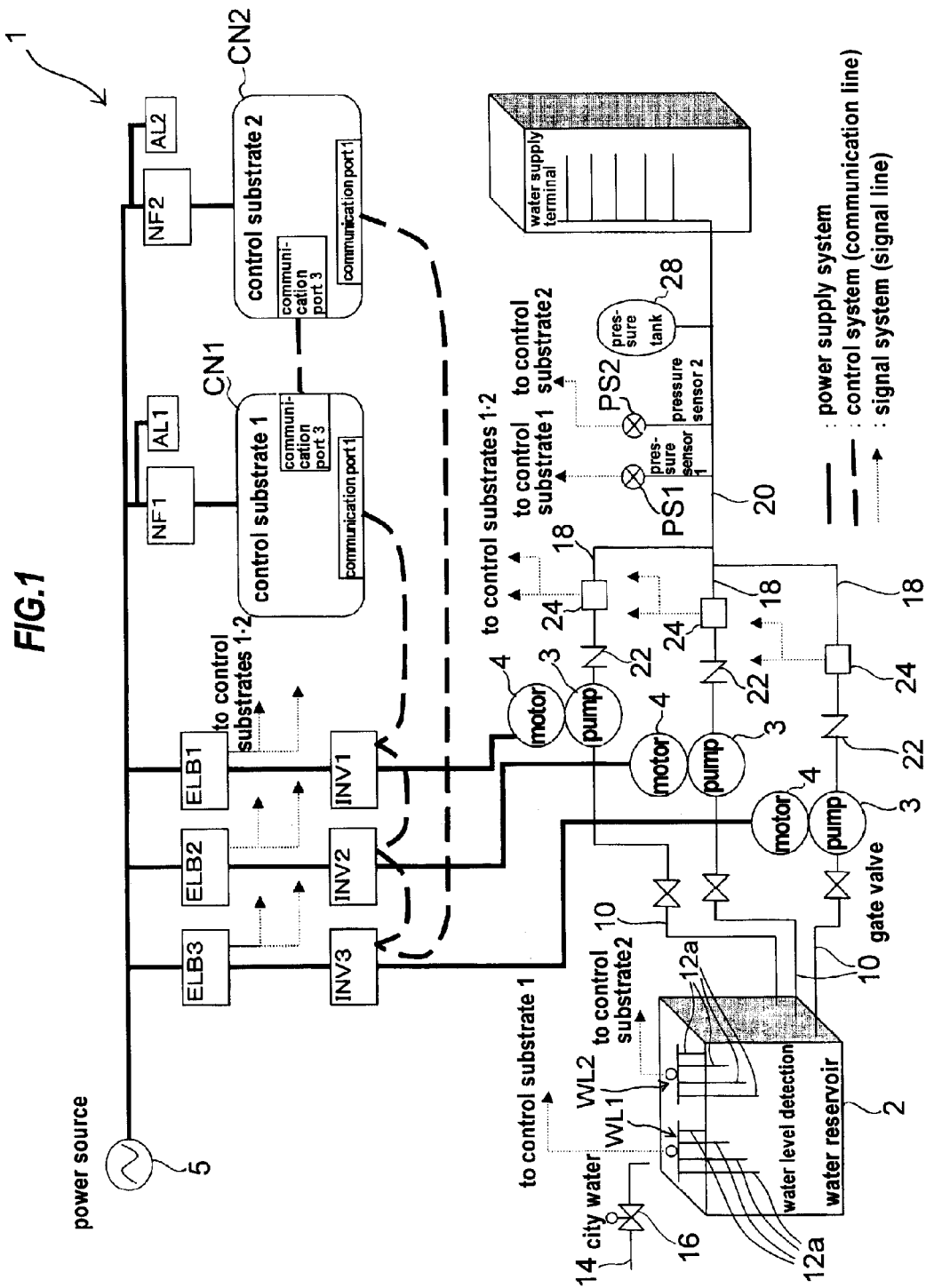
FIG. 1 is a schematic view showing an entire structure of a water supply apparatus according to the present invention.

A water supply apparatus according to embodiments of the present invention will be described below with reference to FIG. 1 through FIG. 17. In FIG. 1 through FIG. 17, the same or corresponding structural elements are denoted by the same reference numerals and repetitive explanations are omitted.

FIG. 1 is a schematic view showing an entire structure of a water supply apparatus 1 according to the present invention. In FIG. 1, solid lines (thick lines) represent a power supply system, dashed lines represent a control system (communication lines), and arrows represent a signal system (signal lines). The water supply apparatus includes a plurality of pumps and a plurality of inverters. In the present embodiment, the water supply apparatus, having three pumps and three inverters, will be described.

As shown in FIG. 1, the water supply apparatus 1 includes a water reservoir 2, three pumps 3 coupled to the water reservoir 2 via pipes 10, three motors 4 for driving the three pumps 3, respectively, three inverters INV1, INV2, and INV3 for controlling rotational speeds of the three motors 4, respectively, and two control substrates (i.e., a control substrate 1 and a control substrate 2) CN1 and CN2 for controlling various devices including the three inverters INV1 to INV3.

Power is supplied to the inverters INV1, INV2, and INV3 from a power source 5 via earth leakage breakers ELB1, ELB2, and ELB3, respectively. Power with controlled frequency is supplied to the motors 4 from the inverters INV1, INV2, and INV3, respectively. Further, power is supplied to the two control substrates (the control substrate 1, the control substrate 2) CN1 and CN2 from the power source 5 via noise filters NF1 and NF2 and surge absorbers AL1 and AL2. The earth leakage breakers ELB1, ELB2, and ELB3 are connected to the control substrate CN1 and the control substrate CN2 via the signal lines, respectively.

The control substrate (control substrate 1) CN1, the inverter INV1, the inverter INV2, the inverter INV3, and the control substrate (control substrate 2) CN2 are connected in series, i.e., linked in a row, by the communication lines. Specifically, a communication port 1 of the control substrate CN1, a port of the inverter INV1, a port of the inverter INV2, a port of the inverter INV3, and a communication port 1 of the control substrate CN2 are connected in this order by RS485. Therefore, when the control substrate CN1 sends a certain command (information), the same command (information) is transmitted to the inverters INV1, INV2, and INV3 and the control substrate CN2. Further, when the control substrate CN2 sends a certain command (information), the same command (information) is transmitted to the inverters INV3, INV2, and INV1 and the control substrate CN1. The control substrate CN1 and the control substrate CN2 are interconnected by RS485 via communication ports 3.

In the above-described structures, when an abnormality occurs in one control substrate CN1 during operation of the water supply apparatus 1, the other control substrate CN2, which is in a standby state, backs up the control substrate CN1, so that the inverters INV1, INV2, and INV3 can be controlled by the control substrate CN2 to thereby maintain operations of the pumps 3.

Abnormalities that can occur in the control substrate CN1 include not only the abnormality in the control substrate CN1 itself (e.g., abnormality in CPU in the control substrate) but also situations in which the control substrate CN1 cannot function normally as a result of an abnormality occurred in one of devices (or one of parts) of the respective systems connected to the control substrate CN1. These situations include an abnormality in the power source, an abnormality in the power supply system for feeding power to the control substrate, a failure of a pressure sensor (e.g., pressure sensor PS1 described later) connected to the control substrate, and the like.

Two sets of water level detectors WL1 and WL2, each having electrode bars 12a for detecting a water level in the water reservoir 2, are provided in the water reservoir 2. The water level detectors WL1 and WL2 in this embodiment detect four liquid levels (full level, low level, return level, dry level). In the present embodiment, the water level detector WL1 is connected to the control substrate CN1 via the signal line, and the water level detector WL2 is connected to the control substrate CN2 via the signal line. City water is introduced, via an electromagnetic valve 16, into the water reservoir 2 through a water supply pipe 14 coupled to a main water pipe (not shown in the drawing). The water level detectors WL1 and WL2 detect the water level in the water reservoir 2, and the control substrate CN1 (or CN2) opens and closes the electromagnetic valve 16 according to an increase and a decrease in the water level. With this structure, the city water is once stored in the water reservoir 2, and the water stored therein is supplied by the pumps 3 to water terminals in a house or the like.

Pipes 18 are connected to discharge sides of the pumps 3, respectively. The three pipes 18 merge into a discharge pipe 20. With these arrangements, the city water in the water reservoir 2 is supplied to the water terminals in a house or the like by the pumps 3 through the pipes 18 and the discharge pipe 20. A check valve 22 and a flow switch 24 are provided in each pipe 18. Output of the flow switch 24 is inputted to the control substrates CN1 and CN2. Specifically, each flow switch 24 is connected to the control substrate CN1 and the control substrate CN2 via signal lines. The check valve 22 is a backwater valve for preventing back flow of the water from a discharge side to a suction side when the pump 3 is stopped. The flow switch 24 is a low-flow detector for detecting a low flow rate of the water flowing through the pipe 18.

Two pressure sensors (a pressure sensor 1, a pressure sensor 2) PS1 and PS2 each for detecting discharge pressure of the pumps 3 are provided in the discharge pipe 20. Output signals of the pressure sensors PS1 and PS2 are inputted into the control substrates CN1 and CN2. Specifically, the pressure sensor PS1 is connected to the control substrate CN1 via a signal line, and the pressure sensor PS2 is connected to the control substrate CN2 via a signal line. A pressure tank 28 is coupled to the discharge pipe 20. When the flow switch 24 detects the low flow rate, the pump 3 is operated so as to accumulate pressure in the pressure tank 28 in order to avoid a no-discharge operation of the pump 3 and then the operation of the pump 3 is stopped.

In this water supply apparatus 1, variable rotational speed control of the pumps 3 is performed using the inverters INV1, INV2, and INV3 based on the output signals of the flow switches 24, the pressure sensors (pressure sensor 1, pressure sensor 2) PS1 and PS2, and the like. Typically, constant discharge-pressure control or estimated constant end-pressure control is performed. The constant discharge-pressure control is a control method of keeping the discharge pressure of the pumps 3 constant by controlling the rotational speeds of the pumps 3 such that pressure signals, detected by the pressure sensors PS1 and PS2, agree with a preset target pressure. The estimated constant end-pressure control is a control method of keeping the water-supply pressure at the water-supply terminal constant by appropriately changing a target value of the discharge pressure of the pumps 3. According to these control methods, the pumps 3 are driven at rotational speeds suited to a required flow rate of the moment, thus achieving energy saving.

When the flow switch 24 is turned on, it is judged that water is not used or the flow rate of the water is low, and the operation of the pump 3 is stopped (a low flow-rate stop operation is performed). When the use of the water is detected based on the decrease in the discharge pressure, the pump is restarted. In the case where the pump 3 is stopped when the flow rate of the water is low, it is possible to perform the pressure accumulating operation in which the pump 3 is accelerated once so as to cause the accumulation of the pressure in the pressure tank 28 and then the pump 3 is stopped.

The water supply apparatus 1 according to this embodiment includes the multiple pumps 3. Therefore, parallel operation of the multiple pumps, which involves addition and separation of pump, may be performed. Further, when an abnormality is detected in one of the pumps 3 or one of the inverters INV1, INV2, and INV3 during operation, the operation may be switched to another normal pump 3 or another normal inverter INV1, INV2, or INV3 so as to maintain the supply of water. The pipes 10 may be connected directly to the main water pipe, without installing the water reservoir 2, to provide a direct-coupling type water supply apparatus.

Figure 2:
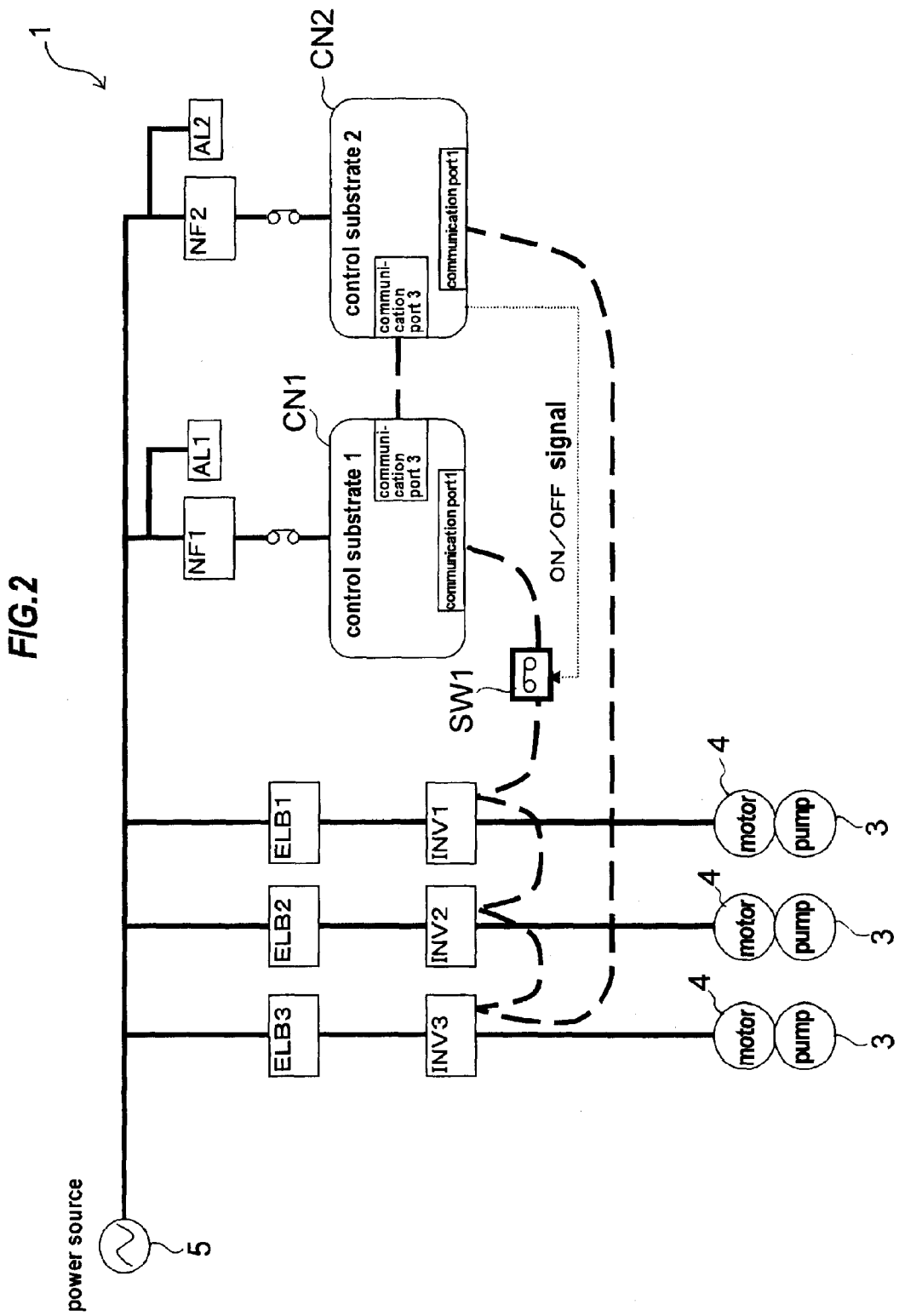
FIG. 2 is a view showing an embodiment of the water supply apparatus according to the present invention and is a schematic view showing further details of a structure of communication lines of the water supply apparatus shown in FIG. 1.

FIG. 2 is a view showing an embodiment of the water supply apparatus according to the present invention and is a schematic view showing further details of a structure of the communication lines of the water supply apparatus shown in FIG. 1. As shown in FIG. 2, one control substrate CN1 is connected to the other control substrate CN2 in series by the communication lines via the three inverters INV1, INV2, and INV3. A switch SW1 for turning on and off the communication is provided on a communication line connecting the control substrate CN1 and the first inverter INV1. Specifically, the switch SW1 for turning on and off the communication is provided on the first communication line of the communication lines connecting the control substrate CN1 and the inverters INV1-INV3. This switch SW1 is a device having a contact and is configured to physically break the communication line. ON/OFF operation of the switch SW1 is performed based on ON/OFF signals outputted from the control substrate CN2.

In the above-described structures, when an abnormality occurs in the control substrate CN1, the other control substrate CN2, which is in a standby state, backs up the control substrate CN1. When the backup operation is performed, the control substrate CN2 outputs an OFF signal for the switch to turn off the switch SW1, thereby physically breaking the communication line between the control substrate CN1 and the inverter INV1. As a result, the three inverters INV1, INV2, and INV3 are controlled only by the control substrate CN2. Therefore, a wrong command from the control substrate CN1 in an abnormal state is not transmitted to the inverters INV1, INV2, and INV3.

Figure 3:
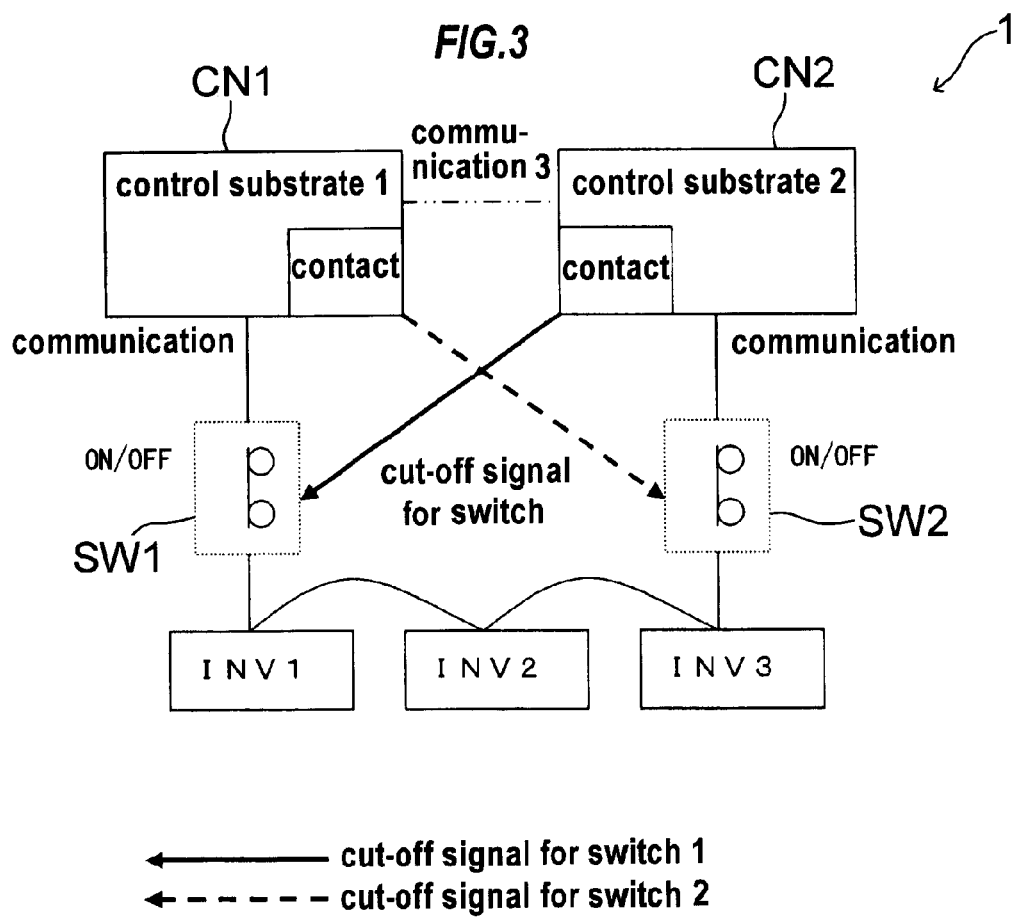
FIG. 3 is a schematic view showing an embodiment in which another switch is added to the water supply apparatus shown in FIG. 1 and FIG. 2.

FIG. 3 is a schematic view showing an embodiment in which a switch SW2 is added to the water supply apparatus shown in FIG. 1 and FIG. 2. Specifically, the switch SW2 for turning on and off the communication is provided on a communication line connecting the control substrate CN2 and the inverter INV3. The switch SW2 is provided on the communication line connecting the control substrate CN2 and the first inverter INV3. ON/OFF operation of the switch SW2 is performed based on ON/OFF signals outputted from the control substrate CN1.

In the above-described structures, when an abnormality occurs in the control substrate CN1, the other control substrate CN2, which is in a standby state, backs up the control substrate CN1. When the backup operation is performed, the control substrate CN2 outputs an OFF signal for the switch to turn off the switch SW1, thereby physically breaking the communication line between the control substrate CN1 and the inverter INV1. As a result, the three inverters INV1, INV2, and INV3 are controlled only by the control substrate CN2. On the other hand, when an abnormality occurs in the control substrate CN2 during operation of the control substrate CN2, the other control substrate CN1, which is in a standby state, backs up the control substrate CN2. When this backup operation is performed, the control substrate CN1 outputs an OFF signal for the switch to turn off the switch SW2, thereby physically breaking the communication line between the control substrate CN2 and the inverter INV3. As a result, the three inverters INV1, INV2, and INV3 are controlled only by the control substrate CN1. Therefore, a wrong command from the control substrate CN2 in an abnormal state is not transmitted to the inverters INV1, INV2, and INV3.

Figure 4:
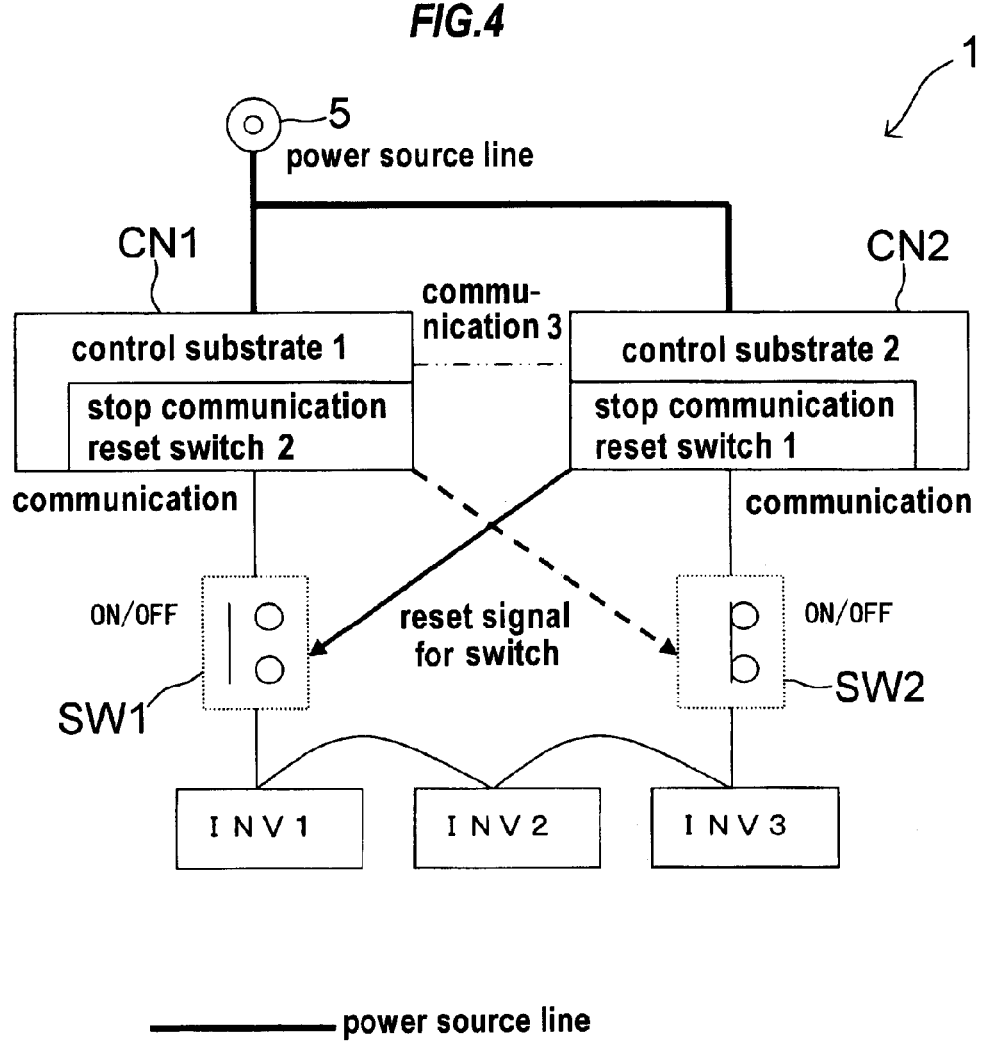
FIG. 4 is a schematic view showing an embodiment in which a function of stopping communication of a control substrate in operation and a function of resetting a switch for turning on and off the communication are added to the water supply apparatus shown in FIG. 3.

FIG. 4 is a schematic view showing an embodiment in which a function of stopping the communication of the control substrate in operation and a function of resetting the switch for turning on and off the communication are added to the water supply apparatus shown in FIG. 3. Specifically, the control substrate CN2 has a reset function to stop the communication of the control substrate CN2 during operation of the control substrate CN2 and to reset the switch SW1 in an OFF state to turn on the switch SW1. The control substrate CN1 also has a function to stop the communication of the control substrate CN1 during operation of the control substrate CN1 and to reset the switch SW2 in an OFF state to turn on the switch SW2.

With the above-described configurations, when an abnormality occurs in the control substrate CN1, the switch SW1 is turned off, and the inverters INV1, INV2, and INV3 are controlled by the control substrate CN2 (FIG. 4 shows this state). While the inverters INV1, INV2, and INV3 are controlled by the control substrate CN2, the communication of the control substrate CN2 is stopped and the switch SW1 in an OFF state is reset to ON. Then, the control substrate CN1 is restarted. As a result, the inverters INV1, INV2, and INV3 can be controlled by the control substrate CN1. While the communication of the control substrate CN2 is stopped, the inverters INV1, INV2, and INV3 are controlled based on previous commands that have been given before the control substrate CN2 stops the communication.

When an abnormality occurs in the control substrate CN2, the switch SW2 is turned off, and the inverters INV1, INV2, and INV3 are controlled by the control substrate CN1. While the inverters INV1, INV2, and INV3 are controlled by the control substrate CN1, the communication of the control substrate CN1 is stopped and the switch SW2 in an OFF state is reset to ON. Then, the control substrate CN2 is restarted. As a result, the inverters INV1, INV2, and INV3 can be controlled by the control substrate CN2. While the communication of the control substrate CN1 is stopped, the inverters INV1, INV2, and INV3 are controlled based on previous commands that have been given before the control substrate CN1 stops the communication.

Figure 5:
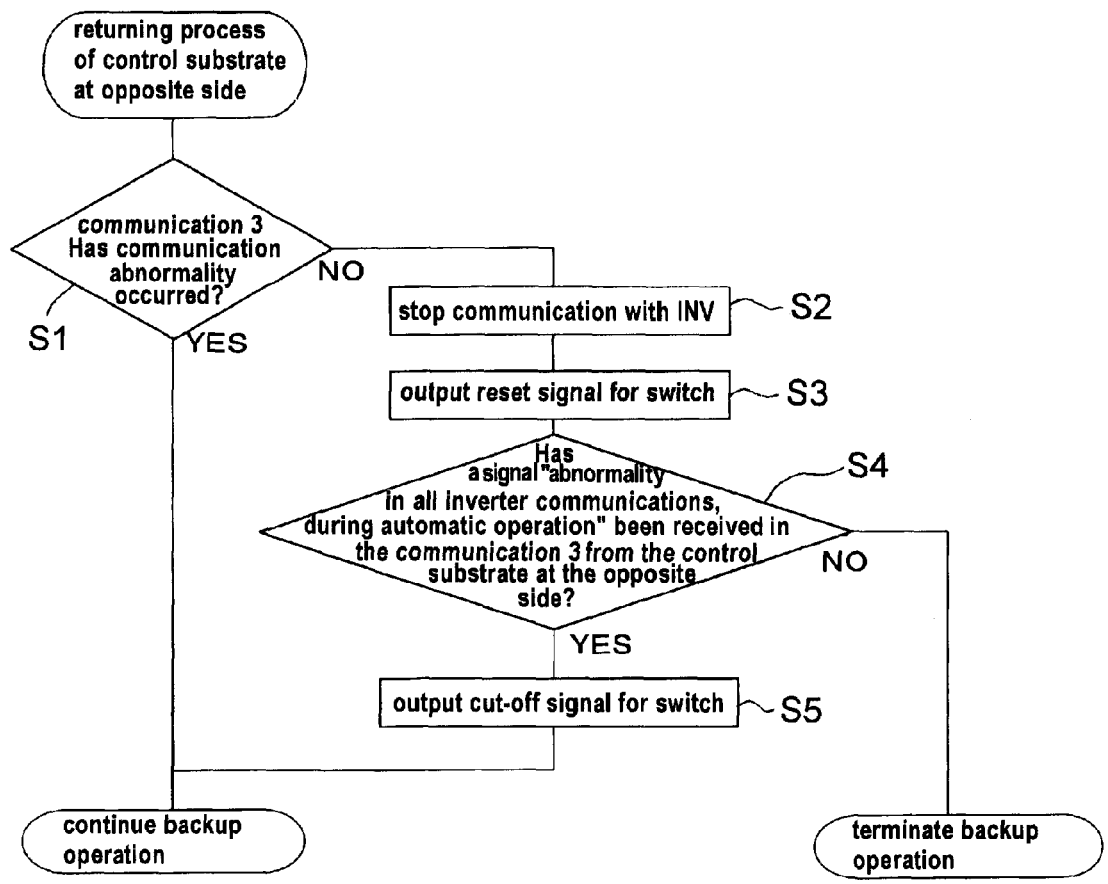
FIG. 5 is a flow chart illustrating a sequence of resetting the switch for turning on and off the communication in the water supply apparatus shown in FIG. 4.

FIG. 5 is a flow chart illustrating a sequence of resetting the switch for turning on and off the communication in the water supply apparatus shown in FIG. 4. As shown in FIG. 5, a returning process of the control substrate at the opposite side is performed according to the following procedures. The following description relates to the backup operation by the control substrate CN2. Descriptions in parentheses indicate a case of the backup operation by the control substrate CN1. At step S1, it is determined whether or not an abnormality has occurred in the communication 3 between the control substrate CN1 and the control substrate CN2. In the event of the abnormality, the backup operation continues without returning the control substrate CN1. When the abnormality does not occur in the communication 3, at step S2, the communication from the control substrate CN2 in operation to the inverters INV1, INV2, and INV3 is stopped. Next, at step S3, the switch SW1 in an OFF signal state is reset to ON. At step S4, it is judged whether or not a signal "abnormality in all inverter communications, during automatic operation" has been received in the communication 3 from the control substrate at the opposite side. If the above signal is not received, the backup operation by the control substrate CN2 is terminated because the system of the control substrate CN1 functions properly. On the other hand, if the above signal is received, at step S5, an OFF signal for the switch SW1 is outputted.

Figure 6:
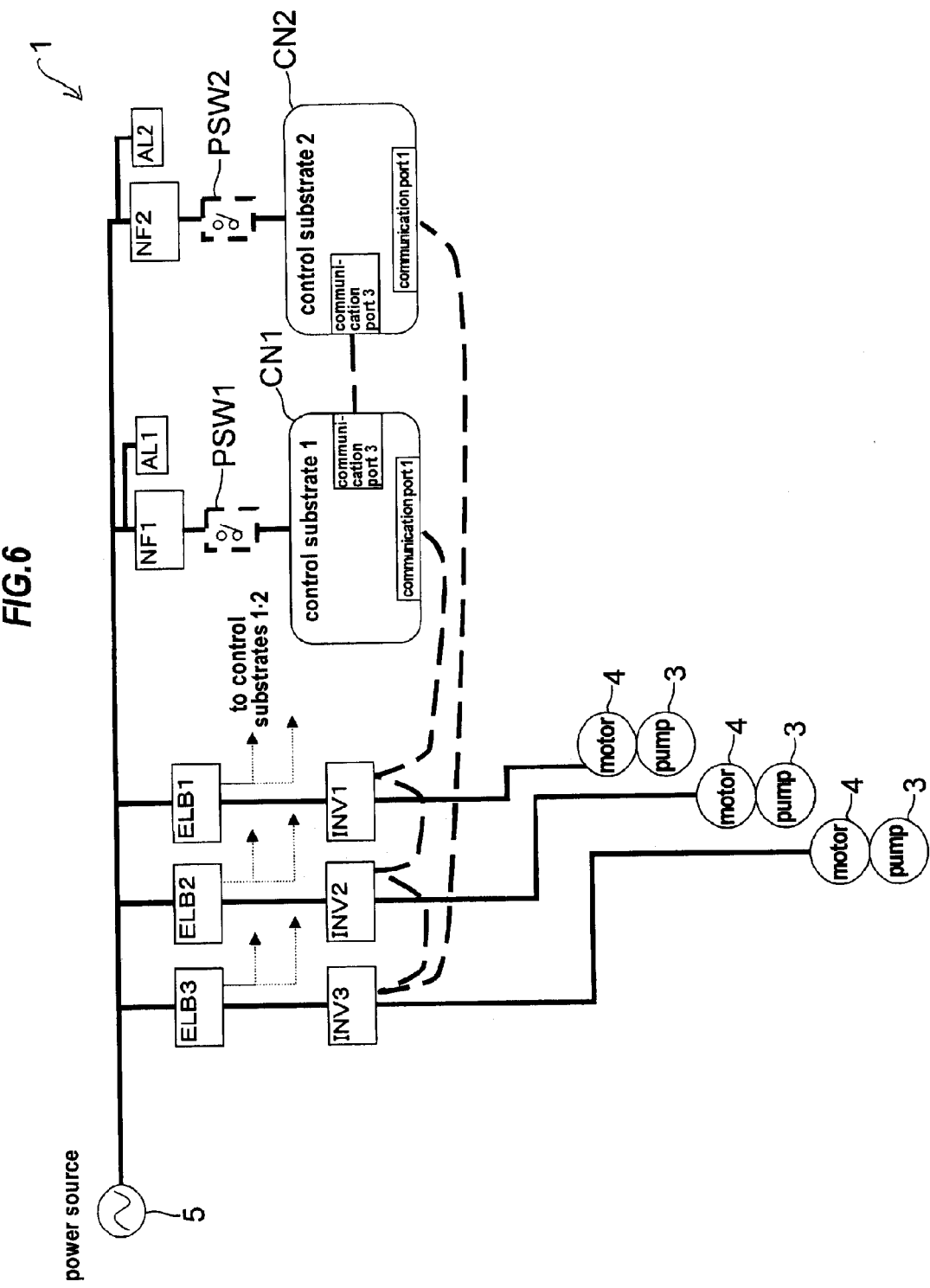
FIG. 6 is a schematic view showing further details of a structure of a power supply system of the water supply apparatus shown in FIG. 1 and FIG. 2.

FIG. 6 is a schematic view showing further details of the power supply system of the water supply apparatus shown in FIG. 1 and FIG. 2. As shown in FIG. 6, power switches PSW1 and PSW2 are provided in the power supply system for supplying power to the control substrates CN1 and CN2, respectively. In this embodiment, the power switch PSW1 is arranged between the noise filter NF1 and the control substrate CN1, and the power switch PSW2 is arranged between the noise filter NF2 and the control substrate CN2. However, the power switches PSW1 and PSW2 may be arranged in the control substrates CN1 and CN2.

With the above-described configurations, when one control substrate or the signal system related thereto is repaired or replaced, the operation can be maintained by the other control substrate. In an ordinary state, the power switches PSW1 and PSW2 are on at all times, and power supply circuits (not shown in the drawing) in the control substrates CN1 and CN2 are also on at all times. Therefore, when an abnormality occurs in the control substrate CN1, the other control substrate CN2 can back up the control substrate CN1 immediately, whereby the operation of the water supply apparatus can be continued. Further, the control substrate CN1 in which the abnormality has occurred can be returned in a short time.

Next, a monitoring system in the water supply apparatus shown in FIG. 1 and FIG. 2 will be described.

Figure 7A:
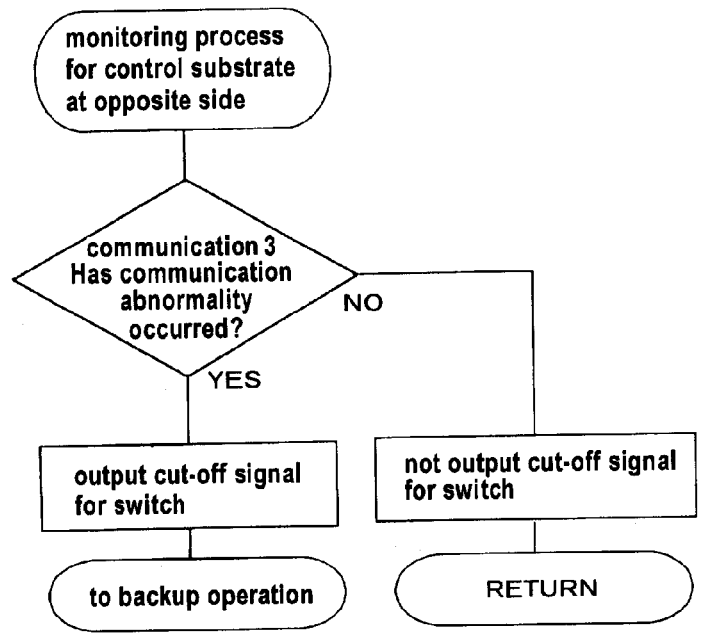
FIG. 7A is a flow chart of a monitoring system for monitoring a control substrate at the opposite side using a communication line connecting one control substrate to the other control substrate.

FIG. 7A is a flow chart of the monitoring system for monitoring the control substrate at the opposite side using the communication line connecting the control substrate CN1 and the control substrate CN2. As shown in FIG. 7A, the monitoring process for the control substrate at the opposite side is performed according to the following procedures. The following description relates to the backup operation by the control substrate CN2 when the control substrate CN1 is in operation. Descriptions in parentheses indicate a case of the backup operation by the control substrate CN1 when the control substrate CN2 is in operation.

As shown in FIG. 7A, it is judged whether or not an abnormality has occurred in the communication 3 that is performed through the communication line connecting the control substrate CN1 and the control substrate CN2, and it is judged whether or not the control substrate CN1 is abnormal. When the control substrate CN1 is abnormal, a cut-off signal (an OFF signal) for the switch SW1 (or SW2) is outputted, and the backup operation by the control substrate CN2 is performed. When the control substrate CN1 is not abnormal, the OFF signal for the switch SW1 is not outputted.

Figure 7B:
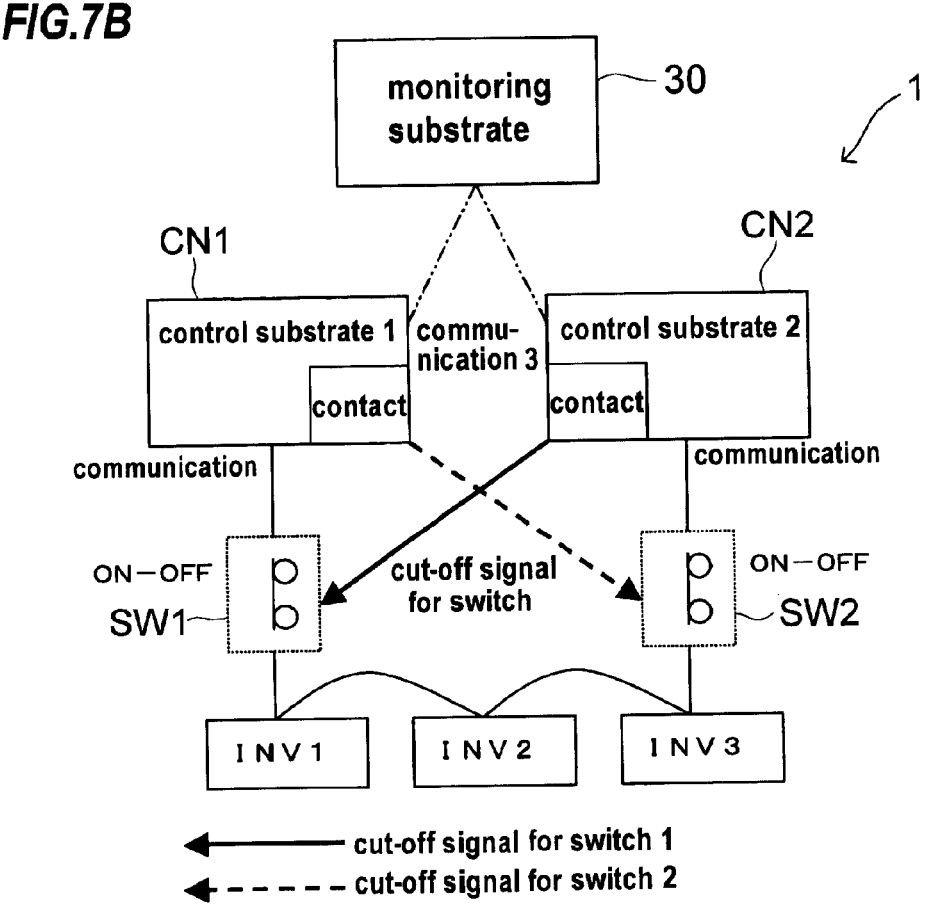
FIG. 7B is a view showing an arrangement of a monitoring substrate.

As shown in FIG. 7B, it is possible to provide a monitoring substrate 30 on the communication line connecting the control substrate CN 1 and the control substrate CN2. The monitoring substrate 30 has communication ports (not shown in the drawing) that can be connected to the control substrate CN1 and the control substrate CN2, and the monitoring substrate 30 is connected to the control substrate CN1 and the control substrate CN2 via communication lines. The monitoring substrate 30 monitors, through these communication lines, whether or not the control substrate CN 1 and the control substrate CN2 are operating normally. When an abnormality occurs in the control substrate CN1, the monitoring substrate 30 notifies the control substrate CN2, through the communication line, that the abnormality has occurred in the control substrate CN1. As shown in this example, it is possible to provide a device for judging abnormalities of both the control substrates CN1 and CN2 comprehensively, instead of providing the function in the control substrate CN2 to judge the abnormality of the other control substrate CN1. In this example also, the control substrates CN1 and CN2 do not judge the abnormalities of themselves, and there is no difference in operation between the examples shown in FIG. 7A and FIG. 7B, except in that the abnormality is notified.

With the above-described configurations, the backup operation or the returning operation after the backup operation can be performed after it is checked whether or not those operations can be performed.

Figure 8:
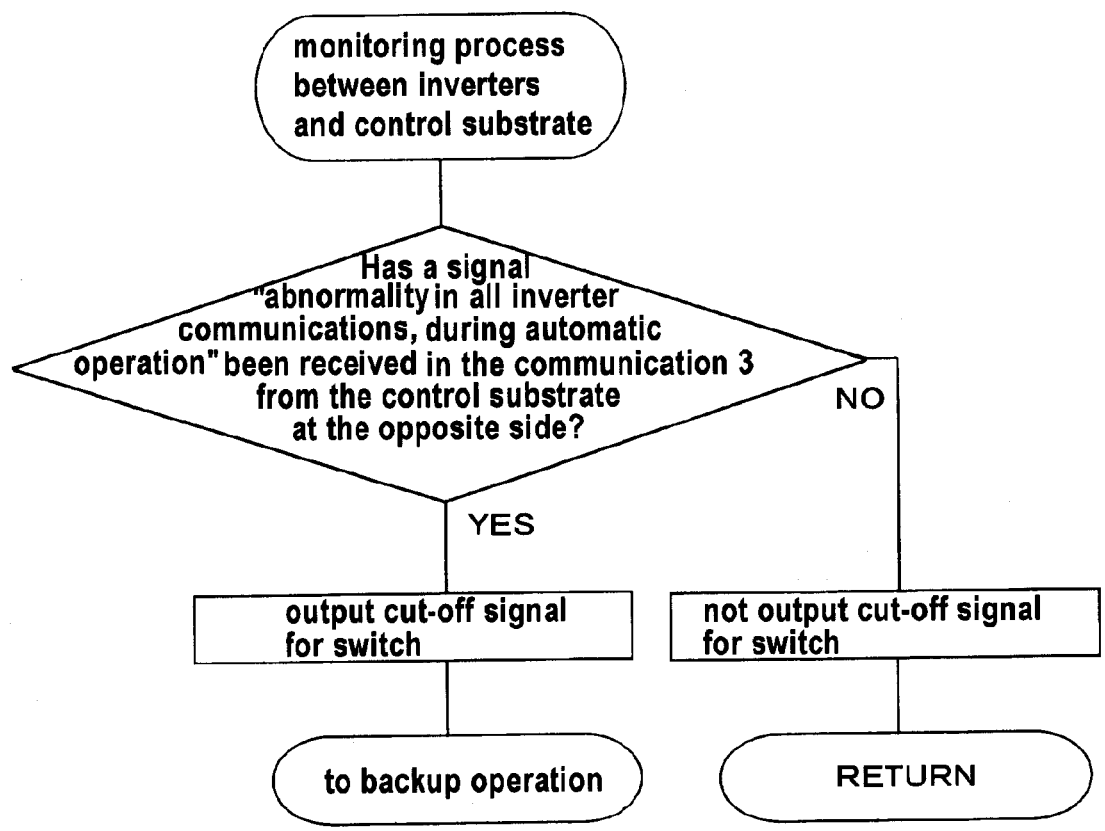
FIG. 8 is a flow chart of a monitoring system for monitoring whether or not the communication is performed normally between the control substrate at the opposite side and inverters, using the communication line connecting one control substrate and the other control substrate.

FIG. 8 is a flow chart of a monitoring system for monitoring whether or not the communication is performed normally between the control substrate at the opposite side and the inverters, using the communication line connecting the control substrate CN1 and the control substrate CN2. As shown in FIG. 8, the monitoring process between the inverters and the control substrate is performed according to the following procedures. The following description relates to the backup operation by the control substrate CN2 when the control substrate CN1 is in operation. Descriptions in parentheses indicate a case of the backup operation by the control substrate CN1 when the control substrate CN2 is in operation.

As shown in FIG. 8, it is judged whether or not a signal "abnormality in all inverter communications, during automatic operation" has been received from the control substrate at the opposite side in the communication 3 that is performed via the communication line between the control substrate CN1 and the control substrate CN2, and it is judged whether or not a communication abnormality between the control substrate CN1 and the inverters INV1, INV2, and INV3 has occurred. In the case of the communication abnormality, an OFF signal for the switch SW1 is outputted, so that the backup operation by the control substrate CN2 is performed. In the case where the communication abnormality does not occur, the OFF signal for the switch SW1 is not outputted.

With the above-described configurations, the backup operation or the returning operation after the backup operation can be performed after it is checked whether or not those operations can be performed.

Figure 9A:
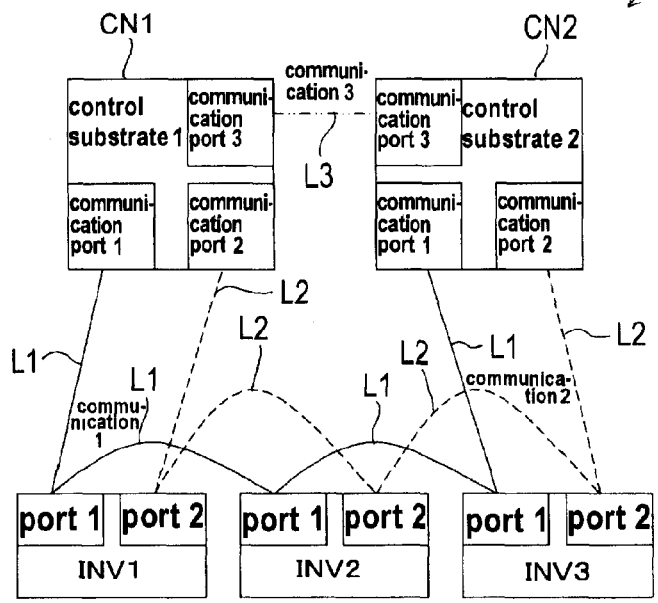
FIG. 9A is a view showing an embodiment of the water supply apparatus according to the present invention.

FIG. 9A is a view showing an embodiment of the water supply apparatus according to the present invention. The water supply apparatus shown in FIG. 1 has one set of communication lines connecting between the control substrates CN1 and CN2 and the inverters INV1, INV2, and INV3. On the other hand, the water supply apparatus shown in FIG. 9A has two sets of communication lines between the control substrates CN1 and CN2 and the inverters INV1, INV2, and INV3.

Specifically, two communication ports (i.e., a communication port 1 and a communication port 2) are provided in each of the control substrates CN1 and CN2, and two ports (i.e., a port 1 and a port 2) are provided in each of the inverters INV1, INV2, and INV3. The control substrate CN1, the inverters INV1, INV2, and INV3, and the control substrate CN2 are connected in series by different communication lines L1 and L2. With these arrangements, two sets of communication lines that enable a communication 1 and a communication 2 are provided. In this embodiment, RS485 is used in the communication lines L1 and L2. In FIG. 9A, the communication lines L1, which are one of the two sets of communication lines, are shown in solid lines, and the communication lines L2, which are the other of the two sets of communication lines, are shown in dotted lines. The control substrate CN1 and the control substrate CN2 are connected by a communication line L3 via communication ports 3, so that a communication 3 can be established between the control substrate CN1 and the control substrate CN2. RS485 is also used in the communication line L3.

According to the water supply apparatus shown in FIG. 9A, in the case where an abnormality has occurred in the communication lines L1, the communication can be maintained by the other communication lines L2. Therefore, this embodiment can prevent the inverters INV1, INV2, and INV3 from going out of control that can be caused by a failure of the communication lines due to noise or the like.

Figure 9B:
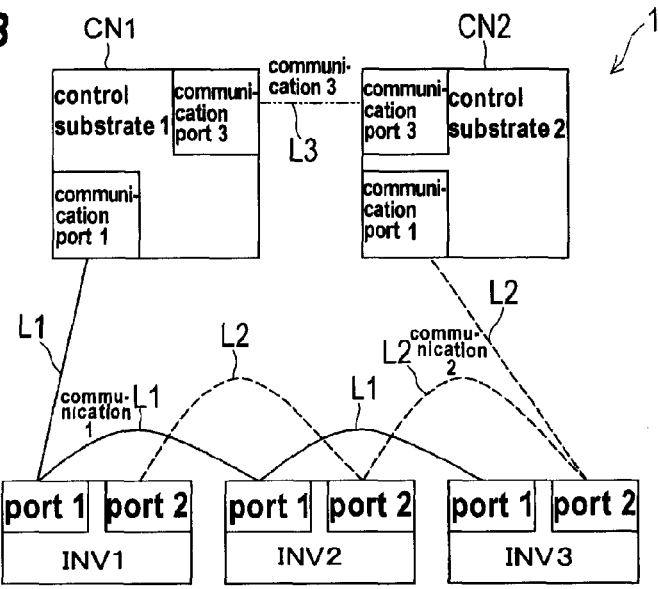
FIG. 9B is a view showing an embodiment of the water supply apparatus according to the present invention.

As shown in FIG. 9B, only one communication port may be provided in each of the control substrate CN1 and the control substrate CN2 such that the control substrate CN1 and the inverters INV1-INV3 are connected in series by communication lines and the control substrate CN2 and the inverters INV1-INV3 are connected in series by different communication lines.

FIG. 10 is a view showing an embodiment of the water supply apparatus according to the present invention. The water supply apparatus shown in FIG. 10 has two sets of communication lines between the control substrates CN1 and CN2 and the inverters INV1, INV2, and INV3, and further has structure that can convey analog signals or contact signals between the control substrates and the inverters INV1, INV2, and INV3.

Specifically, two communication ports (i.e., the communication port 1 and the communication port 2) are provided in each of the control substrates CN1 and CN2, and two ports (i.e., the port 1 and the port 2) are provided in each of the inverters INV1, INV2, and INV3. The control substrate CN1 and the inverters INV1, INV2, and INV3 are connected in series by the communication lines L1, and the control substrate CN2 and the inverters INV3, INV2, and INV1 are connected in series by the communication lines L2. Further, signal lines SL1, SL2, and SL3 through which the analog signals or the contact signals are sent between the control substrate CN2 and the inverters INV1, INV2, and INV3 are provided. The communication lines L1 extend from the control substrate CN1 to the last inverter INV3. The communication lines L2 extend from the control substrate CN2 to the last inverter INV1.

According to the water supply apparatus shown in FIG. 10, in the case where an abnormality has occurred in the communication lines L1, the communication can be maintained by the other communication lines L2, which can thus prevent the inverters INV1, INV2, and INV3 from going out of control that can be caused by a failure of the communication lines due to noise or the like. Further, because the signal lines SL1, SL2, and SL3 that can convey the analog signals or the contact signals between the control substrate CN2 and the inverters INV1, INV2, and INV3 are provided, the inverters INV1, INV2, and INV3 can be controlled so as to output variable rotational speeds in the case where the control substrate CN2 outputs the analog signals, and further the inverters INV1, INV2, and INV3 can be controlled so as to output a plurality of predetermined fixed rotational speeds in a stepwise fashion in the case where the control substrate CN2 outputs the contact signals.

According to the embodiment shown in FIG. 10, even if all of the communications have failed to function properly, the inverters INV1, INV2, and INV3 can be controlled by the analog signals or the contact signals through the signal lines SL1, SL2, and SL3 connecting the control substrate CN2 and the inverters INV1, INV2, and INV3. That is, even when the abnormality occurs in the communications, the analog signals or the contact signals, which are resistant to external causes, such as surge and noise, can back up the communications to thereby allow the water supply apparatus to maintain its operation.

In the embodiment shown in FIG. 10, the structure for transmitting the analog signals or the contact signals between the control substrate and the inverters INV1, INV2, and INV3 is provided in the water supply apparatus having two sets of communication lines between the control substrates CN1 and CN2 and the inverters INV1, INV2, and INV3. Alternatively, the structure for transmitting the analog signals or the contact signals between the control substrate and the inverters INV1, INV2, and INV3 may be provided in the water supply apparatus having one set of communication lines between the control substrates CN1 and CN2 and the inverters INV1, INV2, and INV3. In this case also, even when the abnormality occurs in the communications, the analog signals or the contact signals can back up the communications to thereby allow the water supply apparatus to maintain its operation.

FIG. 11 is a schematic view showing an embodiment in which the switches SW1 and SW2 for turning on and off the communications are provided in the water supply apparatus shown in FIG. 10. As shown in FIG. 11, two communication ports (i.e., the communication port 1 and the communication port 2) are provided in each of the control substrates CN1 and CN2, and two ports (i.e., the port 1 and the port 2) are provided in each of the inverters INV1, INV2, and INV3. The control substrate CN1, the inverters INV1, INV2, and INV3, and the control substrate CN2 are connected in series by different communication lines L1 and L2, which provide two sets of communication lines that enable the communication 1 and the communication 2. Switch SW1 for turning on and off the communication is provided on the communication line connecting the control substrate CN1 and the first inverter INV1. Switch SW2 for turning on and off the communication is provided on the communication line connecting the control substrate CN2 and the first inverter INV3. ON/OFF operation of the switch SW1 is performed based on ON/OFF signals outputted from the control substrate CN2, and ON/OFF operation of the switch SW2 is performed based on ON/OFF signals outputted from the control substrate CN1.

In the above-described structures, when an abnormality occurs in the control substrate CN1 that is in operation, the other control substrate CN2, which is in a standby state, backs up the control substrate CN1. When this backup operation is performed, the control substrate CN2 outputs an OFF signal for the switch to turn off the switch SW1, thereby physically breaking the communication line between the control substrate CN1 and the inverter INV1. As a result, the three inverters INV1, INV2, and INV3 are controlled only by the control substrate CN2. Therefore, a wrong command from the faulty control substrate CN1 is not transmitted to the inverters INV1, INV2, and INV3.

Further, when an abnormality occurs in the control substrate CN2 that is in operation, the other control substrate CN1, which is in a standby state, backs up the control substrate CN2. When this backup operation is performed, the control substrate CN1 outputs an OFF signal for the switch to turn off the switch SW2, thereby physically breaking the communication line between the control substrate CN2 and the inverter INV3. As a result, the three inverters INV1, INV2, and INV3 are controlled only by the control substrate CN1. Therefore, a wrong command from the faulty control substrate CN2 is not transmitted to the inverters INV1, INV2, and INV3.

Because the control substrate CN1 and the control substrate CN2 are configured to output contact signals for turning on and off the communications to the switches SW1 and SW2 as shown in FIG. 11, the apparatus can be made compact. Further, because the switch SW1 (or SW2) for turning on and off the communication is provided on the communication line connecting between the control substrate CN1 (or CN2) and the first inverter INV1 (or INV3), the communication lines from the faulty control substrate can be cut off completely.

FIG. 12 is a view showing an embodiment of the water supply apparatus according to the present invention and is a schematic view showing further details of arrangement of components of the water supply apparatus shown in FIG. 1. In FIG. 12, a surge absorber AL1 and a surge absorber AL2 are provided in the power supply system. A surge withstand current rating of one of the surge absorbers AL1 and AL2 is set to be high, and that of the other is set to be low. Specifically, while the surge absorbers AL1 and AL2 are each configured to absorb surge both between lines and between ground and line and have large discharge withstand current ratings, the surge absorber AL2 has a larger discharge withstand current rating than that of the surge absorber AL1. For example, the surge absorber AL1 has a discharge withstand current rating of 10 kA, while the surge absorber AL2 has a discharge withstand current rating of 20 kA. With these configurations, even if a failure occurs in one surge absorber due to surge caused by lightning, the other can operate normally.

Further, in FIG. 12, a noise attenuation of one of the noise filter NF1 and the noise filter NF2, which are provided in the power supply system, is set to be high, and that of the other is set to be low. Specifically, the noise filter NF2 has a higher level of noise attenuation than that of the noise filter NF1. With these configurations, even if a failure occurs in one of the noise filters due to surge caused by lightning, the other of the noise filters can operate normally.

Furthermore, in FIG. 12, a withstand voltage and an allowable maximum pressure (i.e., water-pressure resistance) of one of the pressure sensor PS1 and the pressure sensor PS2, which are provided in the discharge pipe 20, are set to be high, and those of the other are set to be low. Specifically, the pressure sensor PS2 has a higher level of withstand voltage than that of the pressure sensor PS1, and the pressure sensor PS2 has a higher allowable maximum pressure (i.e., water-pressure resistance) than that of the pressure sensor PS1. For example, the pressure sensor PS2 has a withstand voltage of 250 V, and the pressure sensor PS1 has a withstand voltage of 100 V. The pressure sensor PS2 has an allowable maximum pressure (i.e., water-pressure resistance) that is twice as high as a pressure range, and the pressure sensor PS1 has an allowable maximum pressure (i.e., water-pressure resistance) that is 1.5 times the pressure range.

As described above, in the embodiment of the present invention shown in FIG. 12, the power supply system including the surge absorbers AL1 and AL2 and the noise filters NF1 and NF2 connected respectively to the control substrates CN1 and CN2, the signal system including the pressure sensors PS1 and PS2, and the control system including the communication lines L1 and L2 are each constituted by two sets of systems. The levels of resistance to external causes, such as surge, noise, and water-pressure resistance, are different between the respective two sets of systems.

Specifically, the power supply system is constructed by two sets of systems: a system including the surge absorber AL1 and the noise filter NF1 and connected to the control substrate CN1; and a system including the surge absorber AL2 and the noise filter NF2 and connected to the control substrate CN2. The level of resistance to external causes of one of the two sets of systems is different from the level of resistance to external causes of the other of the two sets of systems. In the present embodiment, the power supply system connected to the control substrate CN2 has a higher level of resistance to external causes than that of the power supply system connected to the control substrate CN1.

Further, the signal system is constructed by two sets of systems: a system including the pressure sensor PS1 and connected to the control substrate CN1; and a system including the pressure sensor PS2 and connected to the control substrate CN2. The level of resistance to external causes of one of the two sets of systems is different from the level of resistance to external causes of the other of the two sets of systems. In the present embodiment, the signal system connected to the control substrate CN2 has a higher level of resistance to external causes than that of the signal system connected to the control substrate CN1.

The control system is constructed by two sets of systems: a system including the communication lines L1 and connected to the control substrate CN1; and a system including the communication lines L2 and connected to the control substrate CN2. The level of resistance to external causes of one of the two sets of systems is different from the level of resistance to external causes of the other of the two sets of systems. In the present embodiment, the control system connected to the control substrate CN2 has a higher level of resistance to external causes than that of the control system connected to the control substrate CN1.

As described above, the systems connected to the control substrate CN2, which is typically used as a backup control substrate, have a higher level of tolerance to the surge and noise and a higher level of resistance to external causes, such as water-pressure resistance. Therefore, when the backup operation is needed, the systems at the backup side including the control substrate CN2 can be operated reliably.

Figure 13:
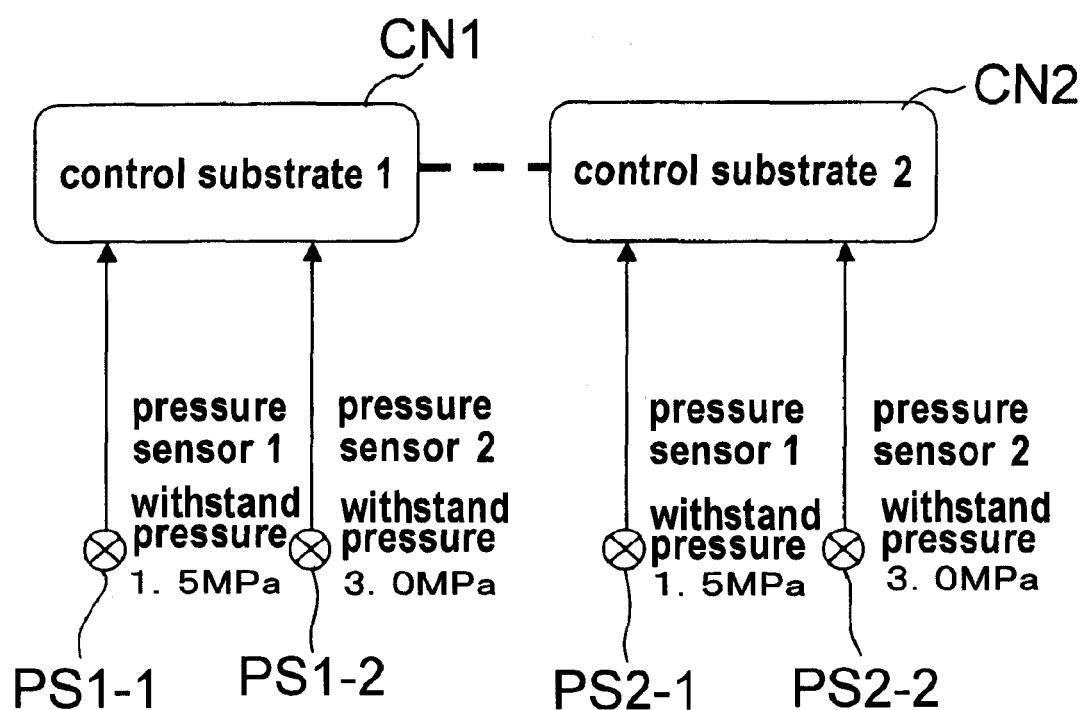
FIG. 13 is a schematic view showing pressure-detecting sections of the water supply apparatus according to an embodiment.

FIG. 13 is a schematic view showing pressure-detecting sections of the water supply apparatus according to an embodiment. As shown in FIG. 13, two sets of pressure sensors are connected to each of the control substrates CN1 and CN2. Specifically, pressure sensors PS1-1 and PS1-2 are connected to the control substrate CN1, and pressure sensors PS2-1 and PS2-2 are connected to the control substrate CN2. In this case, the pressure sensors in the same control substrate have different levels of withstand water-pressure (i.e., water-pressure resistances). Specifically, the pressure sensor PS1-2 has a higher level of withstand water-pressure than a level of withstand water-pressure of the pressure sensor PS1-1, and the pressure sensor PS2-2 has a higher level of withstand water-pressure than a level of withstand water-pressure of the pressure sensor PS2-1. The pressure sensors PS1-2 and PS2-2, each having a higher level of withstand pressure, are used as backup pressure sensors.

As described above, because the multiple pressure sensors have different levels of withstand water-pressure (i.e., water-pressure resistances) in the same control substrate, even if a failure occurs in one pressure sensor, the other pressure sensor can perform pressure detection. Therefore, reliability of the water supply apparatus can be improved. Although not shown in FIG. 13, the four pressure sensors PS1-1, PS1-2, PS2-1, and PS2-2 may be of the same type, which has the same pressure range. In this case, it is possible to detect a failure or an abnormality of the sensor by comparing detected values of the multiple pressure sensors, e.g., four pressure sensors.

The number of pressure sensors connected to each control substrate can be determined appropriately.

Figure 14:
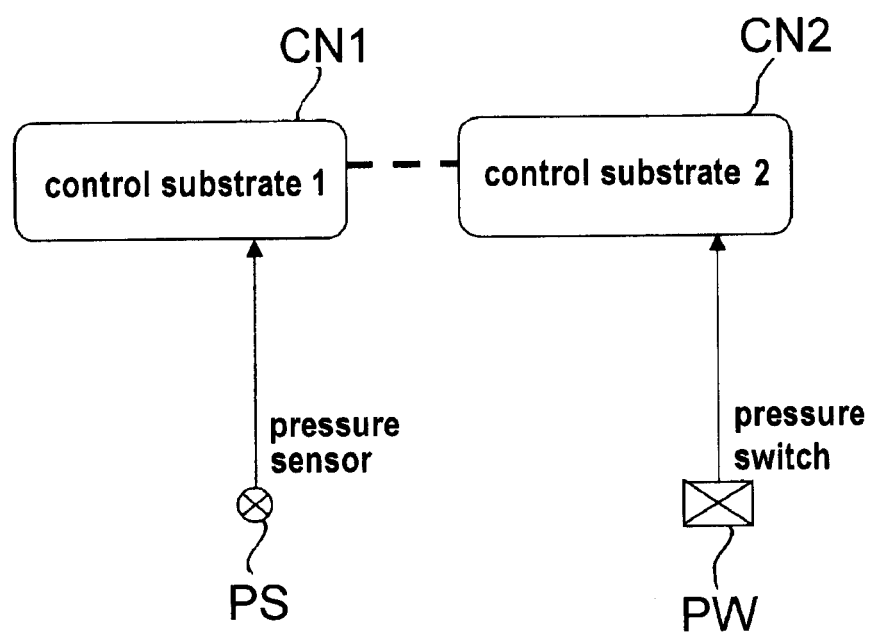
FIG. 14 is a schematic view showing pressure-detecting sections of the water supply apparatus according to another embodiment.

FIG. 14 is a schematic view showing pressure-detecting sections of the water supply apparatus according to another embodiment. As shown in FIG. 14, a pressure sensor PS is provided in one pressure-detecting section connected to one control substrate, and a pressure switch PW is provided in the other pressure-detecting section connected to the other control substrate. In the embodiment shown in FIG. 14, the pressure sensor PS is connected to the control substrate CN1, and the pressure switch PW is connected to the control substrate CN2. The pressure sensor PS is configured to detect pressure and output an analog signal or a digital signal corresponding to the detected pressure value. The pressure switch is configured to output ON/OFF signal corresponding to preset pressure.

As shown in FIG. 14, the pressure sensor PS is connected to the control substrate CN1 and the pressure switch PW is connected to the control substrate CN2. Because the pressure switch PW has a higher level of durability against the external causes, such as noise, than that of the pressure sensor PS, the influence of the external causes can be reduced. Therefore, when the backup operation is needed, the systems at the backup side including the control substrate CN2 can be operated reliably.

Figure 15:
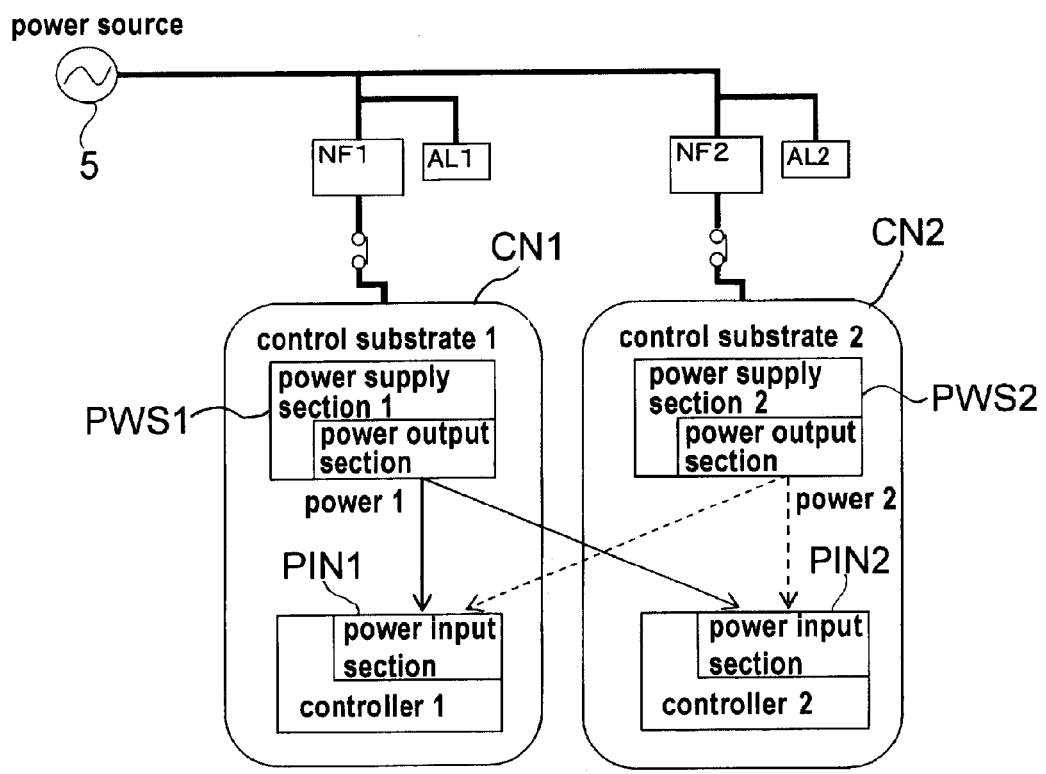
FIG. 15 is a schematic view showing an embodiment in which power input sections are provided in the control substrates of the water supply apparatus.

FIG. 15 is a schematic view showing an embodiment in which power input sections are provided in the control substrates of the water supply apparatus. As shown in FIG. 15, power input sections PIN1 and PIN2 are provided in the control substrates CN1 and CN2, respectively, and power supply sections PWS1 and PWS2 are provided so as to correspond to the power input sections PIN1 and PIN2. The power supply section PWS1 and the power input section PIN1 of the control substrate CN1 are connected, and the power supply section PWS1 of the control substrate CN1 and the power input section PIN2 of the control substrate CN2 are configured to be able to be connected. Further, the power supply section PWS2 and the power input section PIN2 of the control substrate CN2 are connected, and the power supply section PWS2 of the control substrate CN2 and the power input section PIN1 of the control substrate CN1 are configured to be able to be connected.

With these structures, if a failure occurs in the power supply section PWS1 of the control substrate CN1 while the power supply section PWS1 of the control substrate CN1 is feeding power to the power input section PIN1, the power supply section PWS2 of the control substrate CN2 can back up the power supply section PWS1 so as to feed power to the power input section PIN1 of the control substrate CN1. If a failure occurs in the power supply section PWS2 of the control substrate CN2 while the power supply section PWS2 of the control substrate CN2 is feeding power to the power input section PIN2, the power supply section PWS1 of the control substrate CN1 can back up the power supply section PWS2 so as to feed power to the power input section PIN2 of the control substrate CN2. In this case, the power supply section of the faulty control substrate is able to grasp and retain situations of the failure thereof.

While the power supply section is provided in the control substrate in the example shown in FIG. 15, the power supply section may be a power supply substrate provided separately from the control substrate.

Figure 16:
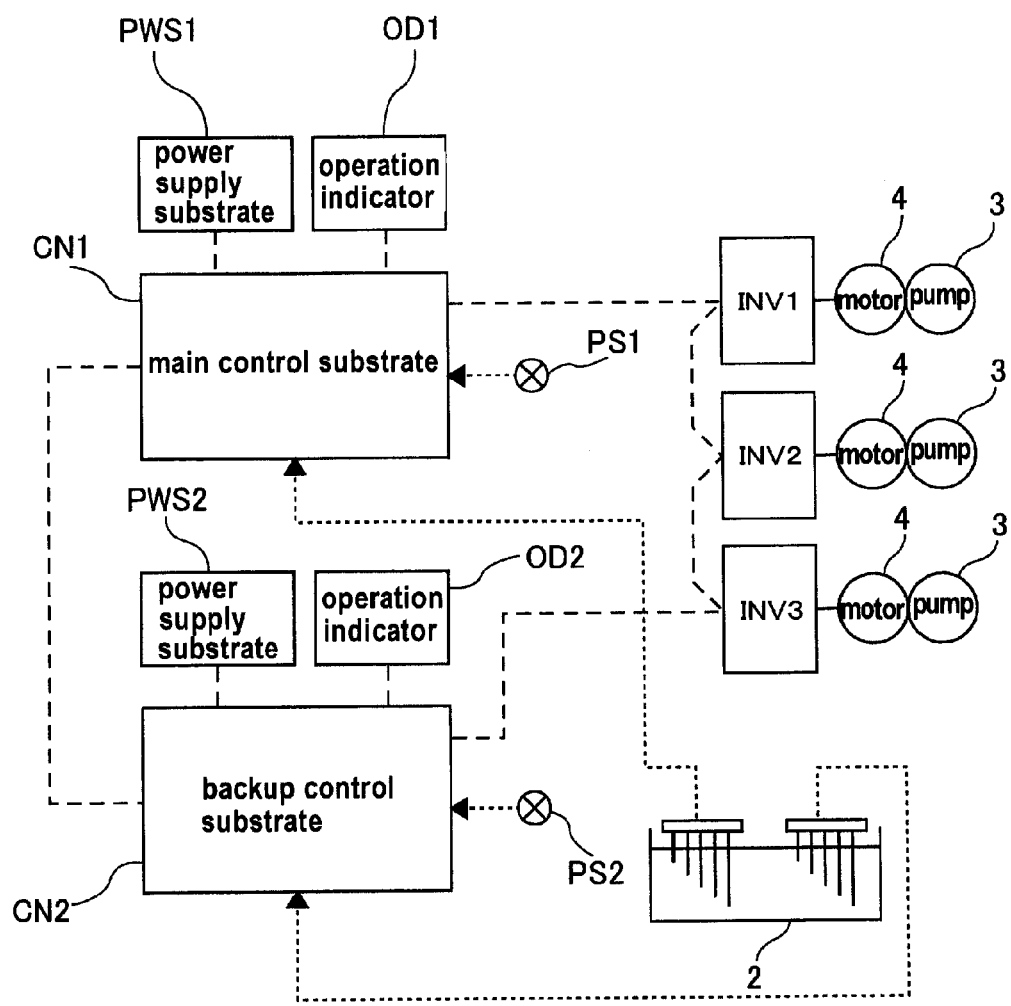
FIG. 16 is a view showing an embodiment of the water supply apparatus according to the present invention.

FIG. 16 is a view showing an embodiment of the water supply apparatus according to the present invention. Structures in this embodiment which will not be described particularly are identical to those of the water supply apparatus shown in FIG. 1. In this embodiment also, the control substrate CN1 functions as a main control substrate, and the control substrate CN2 functions as a backup control substrate. Specifically, in the normal operation, the operations of the pumps are controlled by the control substrate CN1, and in the event of a failure of the control substrate CN1, the backup operation by the control substrate CN2 is performed.

As shown in FIG. 16, the power supply substrates (i.e., power supply sections) PWS1 and PWS2 are connected to the control substrates CN1 and CN2, respectively. The power supply substrates PWS1 and PWS2 are provided separately from the control substrates CN1 and CN2. These power supply substrates PWS1 and PWS2 are connected to the power source 5 via the noise filters NF1 and NF2 and the surge absorbers AL1 and AL2 shown in FIG. 1.

Figure 17:
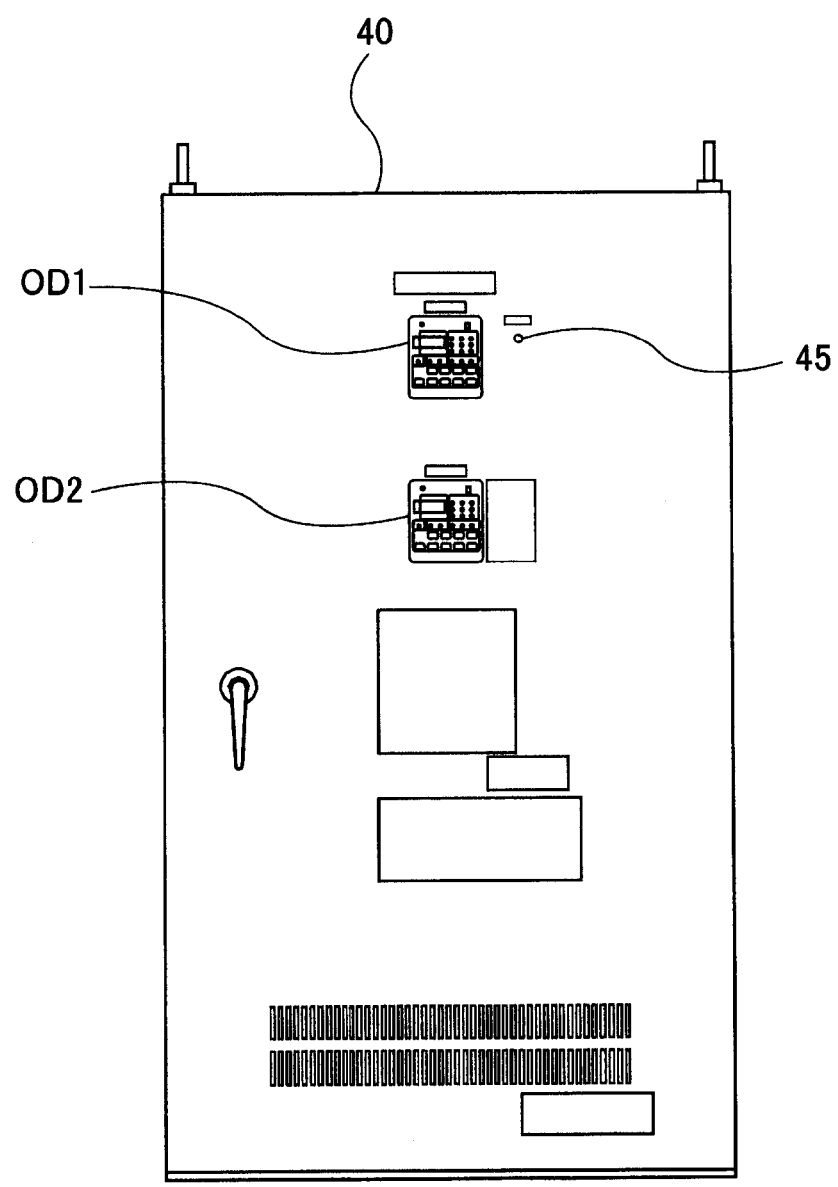
FIG. 17 is a front view showing a control board of the water supply apparatus.

Further, operation indicators OD1 and OD2 are connected to the control substrates CN1 and CN2, respectively. As shown in FIG. 17, each of the operation indicators OD1 and OD2 includes plural buttons and a display, which are arranged so as to appear on a front panel of a control box 40 to thereby accept button operations from the exterior thereof. The above-described control substrates CN1 and CN2 and the power supply substrates PWS1 and PWS2 are housed in the control box 40.

The operation indicators OD1 and OD2 are connected to the control substrates CN1 and CN2 via electrical wirings that are different from the communication ports 1 and 3. Supply of power to the operation indicators OD1 and OD2 is performed through the control substrates CN1 and CN2. The operation indicators OD1 and OD2 serve as input device for various kinds of settings of the water supply apparatus. Specifically, start and stop of the operation of the water supply apparatus are performed through the button operations on the operation indicators OD1 and OD2. Further, various kinds of settings of the water supply apparatus, e.g., setting of a target value of the discharge pressure and setting of whether or not to control the electromagnetic valve 16 (see FIG. 1) of the water reservoir 2, are performed through the operation indicators OD1 and OD2. These settings are stored in non-illustrated memories in the control substrates CN1 and CN2.

It is preferable that both of the control substrates CN1 and CN2 store the same settings therein, other than their intrinsic settings of the control substrates CN1 and CN2 (e.g., a setting of designating the control substrate as the main control substrate or the backup control substrate). Therefore, it is preferable that once the settings are stored in one of the control substrates CN1 and CN2 through the corresponding operation indicator, information of these settings is transmitted to the other control substrate through the communication so that the same settings are stored in both of the control substrates CN1 and CN2.

Further, the displays of the operation indicators OD1 and OD2 are configured to indicate operating conditions of the water supply apparatus, e.g., water-supply pressure detected by the pressure sensors PS1 and PS2 and current values for driving the motors 4. As shown in FIG. 17, a backup lamp 45 for indicating the backup operation is provided on the front panel of the control box 40.

When a failure occurs in the control substrate CN1 or the corresponding pressure sensor PS1, the operation of the water supply apparatus is switched to the backup operation performed by the control substrate CN2. The procedures of switching from the control substrate CN1 to the control substrate CN2 are as follows:

(1) a failure occurs in the control substrate CN1 or the pressure sensor PS1 (a condition for switching to the control substrate CN2 is met);

(2) the operation indicator OD1, connected to the control substrate CN1, generates an alarm indicating the occurrence of the failure;

(3) the operation control of the water supply apparatus is switched from the control substrate CN1 to the control substrate CN2, so that the control substrate CN2 starts operating the pumps 3; and (4) a code, indicating the backup operation, is indicated on both of the operation indicators OD1 and OD2 and the backup lamp 45 on the control box 40 lights up.

Switching to the control substrate CN2 (i.e., the backup operation) is performed automatically when any of the following situations is detected.

(i) A failure of the control substrate CN1
(ii) A failure of the pressure sensor PS1
(iii) A communication abnormality between the control substrate CN1 and all of the inverters INV1 to INV3
(iv) A communication abnormality between the control substrate CN1 and the control substrate CN2 (a failure of the power supply substrate PWS1 connected to the control substrate CN1 is included in this communication abnormality)

The details of the backup operation, other than the alarm and the indication, are identical to those in the previously described embodiment. When the various settings are changed in the control substrate CN2 during the backup operation, information on the change in the settings is shared with the control substrate CN1 through the communication with the control substrate CN1. However, in the case where the communication between the control substrate CN1 and the control substrate CN2 has been shut down, water supply control based on different settings may possibly be performed by the control substrate CN1, upon termination of the backup operation. Thus, with respect to the settings to be shared in the control substrate CN1 and the control substrate CN2, it is preferable to overwrite the settings of the control substrate CN1 with the settings of the control substrate CN2 through the communication between the control substrate CN1 and the control substrate CN2, upon returning from the backup operation.

The operation indicators in this embodiment can be used in the other embodiments described previously. Further, while the operation indicators are provided separately from the control substrates in this embodiment, the operation indicators and the control substrates may be structured integrally.

Although several embodiments of the present invention are described above, the present invention is not intended to be limited to these embodiments. It should be noted that various changes and modifications can be made within the scope of the technical concept of the present invention. For example, while two sets of water level detectors corresponding to the respective control substrate are provided in the embodiment shown in FIG. 1 and FIG. 16, only one set of water level detector may be installed and a signal line from the water level detector may be divided into two lines that are connected to the respective control substrates. In the case of providing one set of water level detector, it is preferable to take measures in each control substrate against the surge and noise that might enter the respective control substrate via the divided signal line.

INDUSTRIAL APPLICABILITY

The present invention is applicable to a water supply apparatus having a plurality of pumps and inverters for supplying water to an apartment house or the like by operating the pumps at variable speeds.

The invention claimed is:
1. A water supply apparatus, comprising:
a plurality of pumps;
a plurality of motors configured to drive said plurality of pumps;
a plurality of inverters each configured for variable rotational speed control of a corresponding one of said plurality of motors; and
a first control board and a second control board each configured to control said plurality of inverters, wherein when an abnormality occurs in said first control board, said second control board backs up said first control board to thereby allow said water supply apparatus to continue its operations, wherein said first control board, said plurality of inverters, and said second control board are connected in series by communication lines, and wherein a switch for turning on and off a communication is provided on said communication lines.

2. The water supply apparatus according to claim 1, wherein an output device configured to output signals for turning on and off said switch is provided in said first control board or said second control board.

3. The water supply apparatus according to claim 1, wherein said switch is provided on a communication line connecting said first control board and/or said second control board to a first one of said plurality of inverters.

4. The water supply apparatus according to claim 2, wherein said first control board and said second control board have a function to stop the communication of said second control board in operation and to reset said switch, in order to restart said first control board after said switch is turned off as a result of occurrence of the abnormality in said first control board.

5. The water supply apparatus according to claim 1, wherein power switches are provided in a power supply system for supplying power to said first control board and said second control board, respectively.

6. The water supply apparatus according to claim 5, wherein said power switches are provided in said first control board and said second control board.

7. The water supply apparatus according to claim 1, wherein said first control board and said second control board are supplied with power at all times.

8. The water supply apparatus according to claim 1, wherein said first control board and said second control board are connected via a communication line, and a monitoring device for monitoring whether or not said first control board and said second control board are operating normally is provided.

9. The water supply apparatus according to claim 1, wherein said first control board and said second control board are connected via a communication line, and a monitoring device for monitoring whether or not said first control board and said second control board are communicating with said plurality of inverters normally is provided.

10. The water supply apparatus according to claim 1, wherein said first control board and said second control board are connected with said plurality of inverters by signal lines that convey analog signals or contact signals.

11. The water supply apparatus according to claim 1, wherein each of said first control board and said second control board has at least one set of pressure-detecting devices.

12. The water supply apparatus according to claim 11,
wherein said first control board and said second control board have pressure-detecting sections;
wherein a pressure sensor is provided in one of said pressure-detecting sections; and
wherein a pressure switch is provided in other of said pressure-detecting sections.

13. The water supply apparatus according to claim 11, further comprising a judging device configured to compare detected values inputted from said pressure-detecting devices into said first control board and said second control board and to judge that the input signals are abnormal when the detected values are different.

14. The water supply apparatus according to claim 1,
wherein said first control board and said second control board have power input sections, respectively; and
wherein each of said power input sections is connected to a corresponding one of power supply sections and is configured to be able to be connected to other of said power supply sections.

15. The water supply apparatus according to claim 14, wherein said first control board and said second control board include said power supply sections therein, respectively.

16. The water supply apparatus according to claim 1, further comprising a plurality of operation indicators through which settings for operation and control of said water supply apparatus are performed, said plurality of operation indicators being connected to said first control board and said second control board
wherein said plurality of operation indicators have displays configured to indicate operating conditions of said water supply apparatus.

17. The water supply apparatus according to claim 1, wherein the abnormality of said first control board includes an abnormality of equipment coupled to said first control board.

* * * * *